US 12,317,267 B2

(12) United States Patent
Yang et al.

(10) Patent No.: US 12,317,267 B2
(45) Date of Patent: May 27, 2025

(54) GENERATING A FEEDBACK CODEBOOK

(71) Applicant: QUALCOMM Incorporated, San Diego, CA (US)

(72) Inventors: Wei Yang, San Diego, CA (US); Seyedkianoush Hosseini, San Diego, CA (US); Peter Gaal, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 483 days.

(21) Appl. No.: 17/579,759

(22) Filed: Jan. 20, 2022

(65) Prior Publication Data

US 2022/0240245 A1  Jul. 28, 2022

Related U.S. Application Data

(60) Provisional application No. 63/140,676, filed on Jan. 22, 2021.

(51) Int. Cl.
  *H04W 72/21*  (2023.01)
  *H04W 72/0446*  (2023.01)
  *H04W 74/08*  (2024.01)

(52) U.S. Cl.
  CPC ....... *H04W 72/21* (2023.01); *H04W 72/0446* (2013.01); *H04W 74/08* (2013.01)

(58) Field of Classification Search
  CPC ... H04L 1/1861; H04L 1/1864; H04L 1/1854; H04W 72/21; H04W 74/08
  See application file for complete search history.

(56) References Cited

U.S. PATENT DOCUMENTS

| | | | |
|---|---|---|---|
| 2022/0094483 A1* | 3/2022 | Hosseini | H04W 72/0446 |
| 2022/0240245 A1* | 7/2022 | Yang | H04L 1/1854 |
| 2023/0224012 A1* | 7/2023 | Zewail | H04B 7/0639 |
| | | | 370/329 |

OTHER PUBLICATIONS

International Search Report and Written Opinion—PCT/US2022/070284—ISA/EPO—May 23, 2022 (2102383WO).

(Continued)

*Primary Examiner* — Mahran Y Abu Roumi
(74) *Attorney, Agent, or Firm* — Holland & Hart LLP/Qualcomm

(57) ABSTRACT

Methods, systems, and devices for wireless communications are described. In some wireless communications systems, a user equipment (UE) may receive, from a base station, an indication of a configuration for transmitting subslot-based feedback messages (e.g., via an uplink channel) associated with downlink transmissions (e.g., received via a downlink channel). In some cases, the UE and base station may generate a feedback codebook for the feedback messages according to a subslot-based codebook generation procedure. For example, the UE and base station may generate the feedback codebook based on a quantity of downlink transmission opportunities ending during each subslot of the uplink channel. The UE may then transmit, to the base station via the uplink channel, the feedback messages in accordance with the feedback codebook.

52 Claims, 19 Drawing Sheets

(56) References Cited

OTHER PUBLICATIONS

NEC: "UE Feedback Enhancements for HARQ-ACK", 3GPP TSG RAN WG1 #104-e, 3GPP Draft, R1-2100948, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25, 2021-Feb. 5, 2021, pp. 1-15, Jan. 19, 2021 (Jan. 19, 2021), XP051971287, Retrieved from the Internet: URL: https://ftp.3gpp.org/tsg_ran/WG1_RL1/TSGR1_104-e/Docs/R1-2100948.zip R1-2100948-UE feedback enhancements for HARQ-ACK.docx [retrieved on Jan. 19, 2021] Section 4, figure 7, section 3.1, the whole document.

Qualcomm Incorporated: "HARQ-ACK Enhancement for IOT and URLLC", 3GPP TSG RAN WG1 #104-e, 3GPP Draft, R1-2101459, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 19, 2021 (Jan. 19, 2021), pp. 1-17, XP051971624, Retrieved from the Internet: URL: https://ftp.3gpp.org/tsg_ran/WG1_RL1/TSGR1_104-e/Docs/R1-2101459.zip, R1-2101459, HARQ-ACK Enhancement for IOT and URLLC.docx [retrieved on Jan. 19, 2021] sections 2, 5, 8, 9, Sec. 7, figure 12, the whole document.

\* cited by examiner

GENERATING A FEEDBACK CODEBOOK

CROSS REFERENCE

The present Application for Patent claims the benefit of U.S. Provisional Patent Application No. 63/140,676 by YANG et al., entitled "GENERATING A FEEDBACK CODEBOOK," filed Jan. 22, 2021, assigned to the assignee hereof, and expressly incorporated by reference herein.

FIELD OF TECHNOLOGY

The following relates to wireless communications, including generating a feedback codebook.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support generating a feedback codebook. Generally, the described techniques provide for a user equipment (UE) to transmit subslot-based feedback messages (e.g., via an uplink channel) associated with downlink transmissions (e.g., received via a downlink channel) when the uplink and downlink channels have different numerologies. For example, the UE may receive, from a base station, a configuration for the feedback messages which may indicate that the feedback messages are subslot-based and may additionally indicate an offset parameter (e.g., a K1 parameter). The UE and base station may generate the codebook for the feedback messages based on the UE being configured for subslot feedback and based on the numerologies for the downlink channel and uplink channel being different. For example, the UE may identify, for each uplink subslot, downlink transmissions that end in that subslot. Then, the UE may transmit a feedback message including feedback information associated with each downlink transmission ending in the subslot. Thus, the UE may be configured to provide subslot-based feedback messages to the base station in cases that the uplink and downlink channels have different numerologies.

A method for wireless communications at a UE is described. The method may include receiving, from a base station, an indication of a configuration for transmission in an uplink channel of one or more feedback messages associated with downlink transmissions received via a downlink channel, where the one or more feedback messages are subslot-based transmissions in the uplink channel, generating a feedback codebook for transmission of the one or more feedback messages based on the one or more feedback messages being subslot-based transmissions, and transmitting, to the base station via the uplink channel, the one or more feedback messages in accordance with the feedback codebook.

An apparatus for wireless communications at a UE is described. The apparatus may include a processor, memory coupled with the processor, and instructions stored in the memory. The instructions may be executable by the processor to cause the apparatus to receive, from a base station, an indication of a configuration for transmission in an uplink channel of one or more feedback messages associated with downlink transmissions received via a downlink channel, where the one or more feedback messages are subslot-based transmissions in the uplink channel, generate a feedback codebook for transmission of the one or more feedback messages based on the one or more feedback messages being subslot-based transmissions, and transmit, to the base station via the uplink channel, the one or more feedback messages in accordance with the feedback codebook.

Another apparatus for wireless communications at a UE is described. The apparatus may include means for receiving, from a base station, an indication of a configuration for transmission in an uplink channel of one or more feedback messages associated with downlink transmissions received via a downlink channel, where the one or more feedback messages are subslot-based transmissions in the uplink channel, means for generating a feedback codebook for transmission of the one or more feedback messages based on the one or more feedback messages being subslot-based transmissions, and means for transmitting, to the base station via the uplink channel, the one or more feedback messages in accordance with the feedback codebook.

A non-transitory computer-readable medium storing code for wireless communications at a UE is described. The code may include instructions executable by a processor to receive, from a base station, an indication of a configuration for transmission in an uplink channel of one or more feedback messages associated with downlink transmissions received via a downlink channel, where the one or more feedback messages are subslot-based transmissions in the uplink channel, generate a feedback codebook for transmission of the one or more feedback messages based on the one or more feedback messages being subslot-based transmissions, and transmit, to the base station via the uplink channel, the one or more feedback messages in accordance with the feedback codebook.

Some examples of the method, apparatuses, and non-transitory computer-readable medium described herein may further include operations, features, means, or instructions for identifying, for each of a set of multiple subslots of the uplink channel, a first quantity of downlink transmission opportunities ending during a respective subslot of the set of multiple subslots, where generating the feedback codebook may be based on the first quantity of the downlink transmission opportunities.

In some examples of the method, apparatuses, and non-transitory computer-readable medium described herein, each of the one or more feedback messages corresponds to one of the set of multiple subslots and may be associated with respective ones of the first quantity of downlink transmission opportunities ending during the respective subslot of the set of multiple subslots.

In some examples of the method, apparatuses, and non-transitory computer-readable medium described herein, generating the feedback codebook may include operations, features, means, or instructions for generating the feedback codebook based at least in part on a first numerology associated with the downlink channel and a second numerology associated with the uplink channel being different.

In some examples of the method, apparatuses, and non-transitory computer-readable medium described herein, generating the feedback codebook may include operations, features, means, or instructions for generating the feedback codebook independent whether a first numerology associated with the downlink channel and a second numerology associated with the uplink channel are different.

In some examples of the method, apparatuses, and non-transitory computer-readable medium described herein, generating the feedback codebook may include operations, features, means, or instructions for generating the feedback codebook according to a subslot-based codebook generation procedure instead of according to a mixed numerology-based codebook generation procedure.

Some examples of the method, apparatuses, and non-transitory computer-readable medium described herein may further include operations, features, means, or instructions for identifying, for each of a set of multiple subslots of the uplink channel, one or more downlink transmission opportunities that overlap a respective subslot of the set of multiple subslots and identifying, for each of the set of multiple subslots, a subset of the one or more downlink transmission opportunities ending during the respective subslot of the set of multiple subslots, where generating the feedback codebook may be based on a first quantity of downlink transmission opportunities within the subset of the one or more downlink transmission opportunities.

Some examples of the method, apparatuses, and non-transitory computer-readable medium described herein may further include operations, features, means, or instructions for receiving, via the downlink channel, a first downlink transmission within a first slot of the downlink channel and a second downlink transmission within a second slot of the downlink channel, where both the first downlink transmission and the second downlink transmission end within a same subslot of the uplink channel and generating a feedback message for transmission via the uplink channel including feedback associated with the first and second downlink transmissions based on both the first and second downlink transmissions ending within the same subslot.

Some examples of the method, apparatuses, and non-transitory computer-readable medium described herein may further include operations, features, means, or instructions for determining that a first slot of the downlink channel and a second slot of the downlink channel overlap with a subslot of the uplink channel and identifying, based on the determining, a first quantity of downlink transmission opportunities within the first slot of the downlink channel and a second quantity of downlink transmission opportunities within the second slot of the downlink channel ending during the subslot of the uplink channel, where generating the feedback codebook may be based on the first quantity of downlink transmission opportunities and the second quantity of downlink transmission opportunities.

Some examples of the method, apparatuses, and non-transitory computer-readable medium described herein may further include operations, features, means, or instructions for identifying a first quantity of slots of the downlink channel that overlap with a subslot of the uplink channel, where generating the feedback codebook is based at least in part on identifying the first quantity of slots.

In some examples of the method, apparatuses, and non-transitory computer-readable medium described herein, the configuration of the one or more feedback messages includes a subslot offset between receipt of the downlink transmissions and transmission of the one or more feedback messages, and transmitting the one or more feedback messages may be based on the subslot offset.

In some examples of the method, apparatuses, and non-transitory computer-readable medium described herein, generating the feedback codebook may include operations, features, means, or instructions for generating the feedback codebook for transmission of the one or more feedback messages for each of a set of multiple possible subslot offsets including at least the subslot offset.

In some examples of the method, apparatuses, and non-transitory computer-readable medium described herein, receiving the configuration may include operations, features, means, or instructions for receiving radio resource control (RRC) signaling indicating the configuration for transmission of the one or more feedback messages.

In some examples of the method, apparatuses, and non-transitory computer-readable medium described herein, slots of the downlink channel may be first transmission time intervals (TTIs) each having a first number of symbols, and subslots of the uplink channel may be second TTIs each with fewer than the first number of symbols.

A method for wireless communications at a base station is described. The method may include transmitting, to a UE, an indication of a configuration for transmission in an uplink channel of one or more feedback messages associated with downlink transmissions received via a downlink channel, where the one or more feedback messages are subslot-based transmissions in the uplink channel, generating a feedback codebook for transmission of the one or more feedback messages based on the one or more feedback messages being subslot-based transmissions, from the UE via the uplink channel, the one or more feedback messages in accordance with the feedback codebook.

An apparatus for wireless communications at a base station is described. The apparatus may include a processor, memory coupled with the processor, and instructions stored in the memory. The instructions may be executable by the processor to cause the apparatus to transmit, to a UE, an indication of a configuration for transmission in an uplink channel of one or more feedback messages associated with downlink transmissions received via a downlink channel, where the one or more feedback messages are subslot-based transmissions in the uplink channel, generate a feedback codebook for transmission of the one or more feedback messages based on the one or more feedback messages being subslot-based transmissions, from the UE via the uplink channel, the one or more feedback messages in accordance with the feedback codebook.

Another apparatus for wireless communications at a base station is described. The apparatus may include means for transmitting, to a UE, an indication of a configuration for transmission in an uplink channel of one or more feedback messages associated with downlink transmissions received via a downlink channel, where the one or more feedback messages are subslot-based transmissions in the uplink channel, means for generating a feedback codebook for transmission of the one or more feedback messages based on the one or more feedback messages being subslot-based transmissions, and means for receiving, from the UE via the uplink channel, the one or more feedback messages in accordance with the feedback codebook.

A non-transitory computer-readable medium storing code for wireless communications at a base station is described. The code may include instructions executable by a processor to transmit, to a UE, an indication of a configuration for transmission in an uplink channel of one or more feedback messages associated with downlink transmissions received via a downlink channel, where the one or more feedback messages are subslot-based transmissions in the uplink channel, generate a feedback codebook for transmission of the one or more feedback messages based on the one or more feedback messages being subslot-based transmissions, and receive, from the UE via the uplink channel, the one or more feedback messages in accordance with the feedback codebook.

Some examples of the method, apparatuses, and non-transitory computer-readable medium described herein may further include operations, features, means, or instructions for identifying, for each of a set of multiple subslots of the uplink channel, a first quantity of the downlink transmission opportunities ending during a respective subslot of the set of multiple subslots, where generating the feedback codebook may be based on the first quantity of the downlink transmission opportunities.

In some examples of the method, apparatuses, and non-transitory computer-readable medium described herein, each of the one or more feedback messages corresponds to one of the set of multiple subslots and may be associated with respective ones of the first quantity of downlink transmission opportunities ending during the respective subslot of the set of multiple subslots.

In some examples of the method, apparatuses, and non-transitory computer-readable medium described herein, generating the feedback codebook may include operations, features, means, or instructions for generating the feedback codebook based at least in part on a first numerology associated with the downlink channel and a second numerology associated with the uplink channel being different.

In some examples of the method, apparatuses, and non-transitory computer-readable medium described herein, generating the feedback codebook may include operations, features, means, or instructions for generating the feedback codebook independent of whether a first numerology associated with the downlink channel and a second numerology associated with the uplink channel are different.

In some examples of the method, apparatuses, and non-transitory computer-readable medium described herein, generating the feedback codebook may include operations, features, means, or instructions for generating the feedback codebook according to a subslot-based codebook generation procedure instead of according to a mixed numerology-based codebook generation procedure.

Some examples of the method, apparatuses, and non-transitory computer-readable medium described herein may further include operations, features, means, or instructions for identifying, for each of a set of multiple subslots of the uplink channel, one or more downlink transmission opportunities that overlap a respective subslot of the set of multiple subslots and identifying, for each of the set of multiple subslots, a subset of the one or more downlink transmission opportunities ending during the respective subslot of the set of multiple subslots, where generating the feedback codebook may be based on a first quantity of downlink transmission opportunities within the subset of the one or more downlink transmission opportunities.

Some examples of the method, apparatuses, and non-transitory computer-readable medium described herein may further include operations, features, means, or instructions for transmitting, via the downlink channel, a first downlink transmission within a first slot of the downlink channel and a second downlink transmission within a second slot of the downlink channel, where both the first downlink transmission and the second downlink transmission end within a same subslot of the uplink channel, where one of the one or more feedback messages includes feedback associated with the first and second downlink transmissions based on both the first and second downlink transmissions ending within the same subslot.

Some examples of the method, apparatuses, and non-transitory computer-readable medium described herein may further include operations, features, means, or instructions for determining that a first slot of the downlink channel and a second slot of the downlink channel overlap with a subslot of the uplink channel and identifying, based on the determining, a first quantity of downlink transmission opportunities within the first slot of the downlink channel and a second quantity of downlink transmission opportunities within the second slot of the downlink channel ending during the subslot of the uplink channel, where generating the feedback codebook may be based on the first quantity of downlink transmission opportunities and the second quantity of downlink transmission opportunities.

Some examples of the method, apparatuses, and non-transitory computer-readable medium described herein may further include operations, features, means, or instructions for identifying a first quantity of slots of the downlink channel that overlap with a subslot of the uplink channel, where generating the feedback codebook is based at least in part on identifying the first quantity of slots.

In some examples of the method, apparatuses, and non-transitory computer-readable medium described herein, the configuration of the one or more feedback messages includes a subslot offset between receipt of the downlink transmissions and transmission of the one or more feedback messages, and receiving the one or more feedback messages may be based on the subslot offset.

In some examples of the method, apparatuses, and non-transitory computer-readable medium described herein, generating the feedback codebook may include operations, features, means, or instructions for generating the feedback codebook for transmission of the one or more feedback messages for each of a set of multiple possible subslot offsets including at least the subslot offset.

In some examples of the method, apparatuses, and non-transitory computer-readable medium described herein, transmitting the configuration may include operations, features, means, or instructions for receiving RRC signaling indicating the configuration for transmission of the one or more feedback messages.

In some examples of the method, apparatuses, and non-transitory computer-readable medium described herein, slots of the downlink channel may be first TTIs intervals each having a first number of symbols, and subslots of the uplink channel may be second TTIs each with fewer than the first number of symbols.

DETAILED DESCRIPTION

In some wireless communications systems, a user equipment (UE) may receive downlink transmissions (e.g., downlink data transmissions) from a base station (e.g., via a downlink channel such as a physical downlink shared channel (PDSCH)). In some cases, the UE may be configured to transmit one or more feedback messages associated with the downlink transmissions. That is, the UE may transmit, via an uplink channel such as a physical uplink control channel (PUCCH), feedback messages indicating whether the UE successfully received and decoded the downlink transmissions. In some cases, the UE may be configured to transmit the feedback associated with a downlink transmission on a slot-basis. That is, the UE may transmit one feedback message associated with a slot including feedback for each downlink transmission received during that slot. In some other cases, the UE may be configured to transmit feedback messages associated with a transmission time interval (TTI) that is less than the slot (e.g., to reduce latency). For example, the UE may transmit one feedback message associated with a subslot and including feedback for downlink transmissions received during that subslot.

In some cases, the base station may transmit, to the UE, a configuration for the feedback messages. The configuration may indicate that the feedback messages are subslot-based and may additionally indicate a subslot offset parameter (e.g., a K1 parameter). Based on the configuration for the feedback messages, the UE and base station may generate the codebook for the feedback messages. For example, the UE may identify, for each uplink subslot, downlink transmissions that end in that subslot. Then, the UE may transmit a feedback message (e.g., within an uplink subslot indicated by the subslot offset parameter) including feedback information associated with each downlink transmission ending in the subslot. In some examples, the UE may be configured to provide feedback messages to the base station in cases that the uplink and downlink channels have different numerologies.

Aspects of the disclosure are initially described in the context of wireless communications systems. Aspects of the disclosure are then described in the context of feedback transmission schemes and a process flow. Aspects of the disclosure are further illustrated by and described with reference to apparatus diagrams, system diagrams, and flowcharts that relate to generating a feedback codebook.

Figure 1:
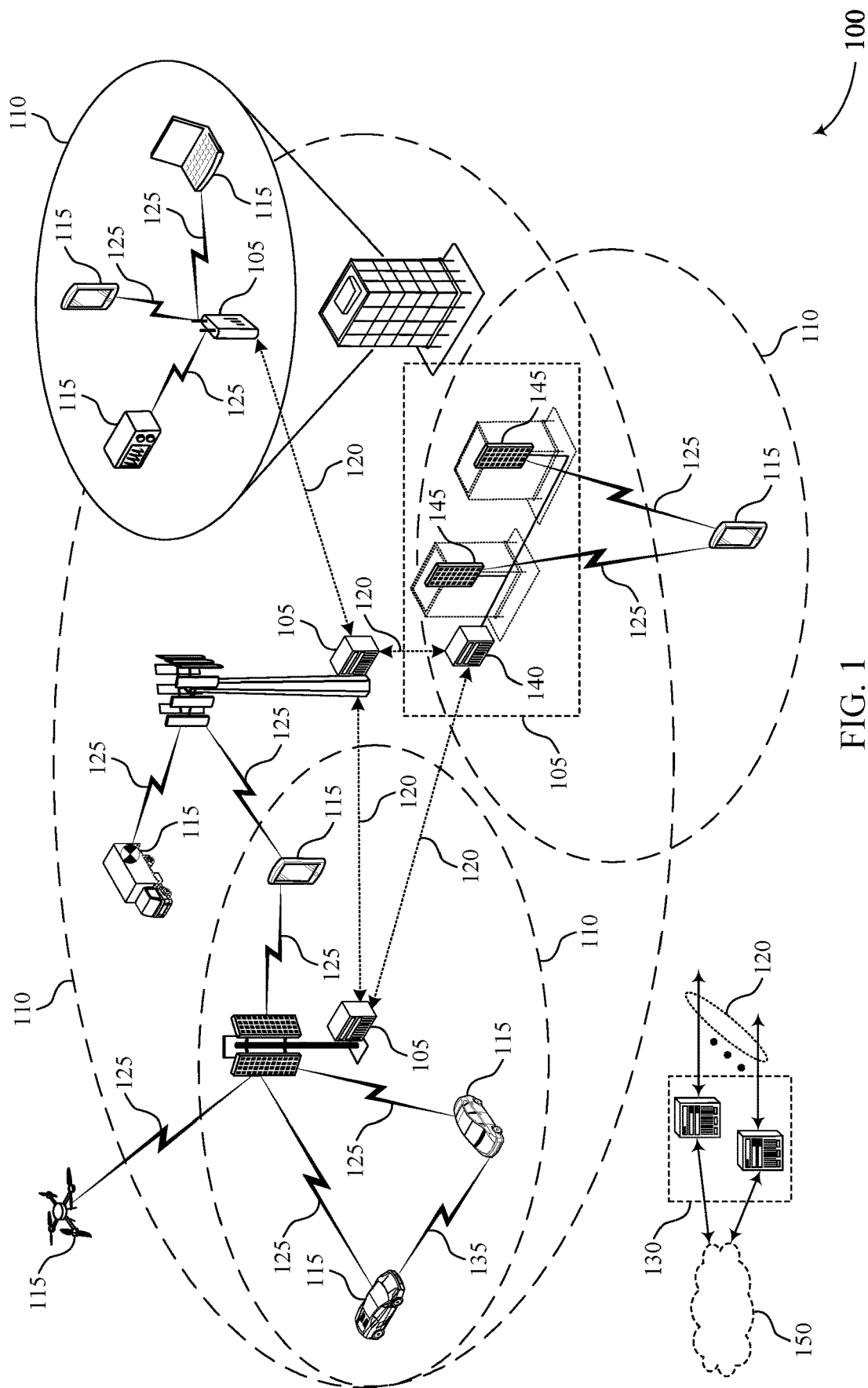
FIG. 1 illustrates an example of a wireless communications system that supports generating a feedback codebook in accordance with aspects of the present disclosure.

FIG. 1 illustrates an example of a wireless communications system 100 that supports generating a feedback codebook in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. In some examples, a UE 115 and base station 105 may communicate using channels having different numerologies. For example, an uplink channel (e.g., a PUCCH) between a UE 115 and base station 105 may have a first numerology while a downlink channel (e.g., a PDSCH) between the UE 115 and base station 105 may have a second numerology different from the first numerology. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots (e.g., subslots) containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a TTI. In some examples, the TTI duration (e.g., the number of symbol periods in a TTI) may be variable.

Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC (media access control) layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Additionally or alternatively, the UEs 115 may be configured to transmit feedback messages to the base stations 105 to provide feedback (e.g., acknowledgement (ACK) feedback, negative acknowledgement (NACK) feedback) associated with one or more downlink transmissions. That is, a UE 115 may receive downlink transmissions (e.g., downlink data transmissions) from a base station 105 and the UE 115 may be configured to transmit one or more feedback messages associated with the downlink transmissions via an uplink channel. In some examples, the UE 115 may generate a codebook for the feedback messages. For example, the UE 115 may generate a semi-static codebook (e.g., a Type 1 semi-static codebook) that is predetermined based on semi-static information configured by radio resource control (RRC) signaling. In another example, the UE 115 may generate a dynamic codebook (e.g., a Type 2 dynamic codebook) that is constructed based on indications received in DCI (downlink control information) (e.g., downlink assignment index (DAI) indications in the DCI).

In some cases, a UE 115 may transmit one feedback message associated with a slot including feedback for each downlink transmission received during that slot. The UE 115 may transmit the feedback message associated with the slot in a subsequent slot determined based on a slot offset parameter (K1) indicated to the UE 115 by the base station 105 (e.g., via RRC signaling, via DCI). To generate the feedback codebook, the UE 115 may identify the downlink transmission opportunities (e.g., time domain resource allocations (TDRAs)) within a slot of the downlink channel. The UE 115 may then determine a maximum quantity of non-overlapping downlink transmissions that can be scheduled within the slot of the downlink channel (e.g., based on identifying the downlink transmission opportunities). Then, the UE 115 may generate the feedback message (e.g., associated with the slot) based on the maximum quantity of non-overlapping downlink transmissions. For example, if the UE 115 determines a maximum number of two non-overlapping downlink transmissions that can be scheduled within the downlink slot, the UE 115 may generate a feedback message including two HARQ-ACK bits. In some cases, the UE 115 may be configured to determine the number of bits within the feedback message and how to map each downlink transmission opportunity to a bit within the feedback message. In some cases, the UE 115 may generate the feedback codebook for each possible slot offset parameter.

In some instances of the UE 115 transmitting feedback messages associated with a slot, the numerologies of the downlink channel and the uplink channel may be different. As a result, a slot of the downlink channel may be a different duration than a slot of the uplink channel. For example, one downlink slot may include multiple uplink slots (e.g., two uplink slots, three uplink slots, four uplink slots). Here, the UE 115 and base station 105 may generate the feedback codebook for each downlink slot according to a mixed numerology-based codebook generation procedure. In order to remove any feedback redundancy (e.g., resulting from more uplink slots than downlink slots due to the different numerologies of the uplink and downlink channels), the UE 115 may only determine a quantity of downlink transmission occasions within a slot of the downlink channel for a subset of the slots of the uplink channel. In one example, the UE 115 may determine the subset of the slots of the uplink channel (e.g., for determining the quantity of downlink transmission occasions within the slot of the downlink channel) according to Equation 1, shown below.

$$\mathrm{mod}(n_u-K1+1, N_{UL}^{DL})=0 \quad (1)$$

That is, the UE 115 may determine the quantity of downlink transmission occasions for uplink slots $n_u$–K1 with K1 values that satisfy Equation 1. Here, $n_u$ may denote the uplink slot in which the UE 115 transmits the feedback message, and $N_{UL}^{DL}$ may correspond to the number of uplink slots within a downlink slot. In an example where each downlink slot includes two uplink slots, the UE 115 may determine the quantity of downlink transmission occasions within a downlink slot within every other uplink slot. Additionally, the UE 115 may measure the slot offset (e.g., K1) with reference to the quantity of uplink slots.

In some other cases, the UE 115 may transmit feedback messages associated with a TTI that is less than a slot (e.g., a subslot) when the uplink and downlink channels have a same numerology. For example, the UE 115 may transmit a feedback message associated with a downlink slot including feedback for each downlink transmission received during that downlink slot. The UE 115 may transmit the feedback message associated with the downlink slot in a subsequent uplink subslot determined based on a subslot offset parameter (K1) indicated to the UE 115 by the base station 105 (e.g., via RRC signaling, via DCI). In some cases, transmitting subslot-based feedback messages may reduce latency when compared to transmitting slot-based feedback messages. To generate the feedback codebook for subslot-based feedback messages, the UE 115 and base station 105 may follow a subslot-based codebook generation procedure. For example, the UE 115 may identify, for each uplink subslot, the downlink transmission opportunities (e.g., TDRAs) ending within the respective uplink subslot. The UE 115 may then determine a maximum quantity of non-overlapping downlink transmissions that can be scheduled to end within the subslot of the uplink channel (e.g., based on identifying the downlink transmission opportunities). Then, the UE 115 may generate the feedback message (e.g., associated with the uplink subslot) based on the maximum quantity of non-overlapping downlink transmissions.

In the example of wireless communications system 100, the UE 115 may be configured to generate subslot-based feedback messages. For example, the base station 105 may transmit, to UE 115, a configuration for the feedback messages. The configuration may indicate that the feedback messages are subslot-based and may additionally indicate a subslot offset parameter (e.g., a K1 parameter). Based on the configuration for the feedback messages, the UE 115 and base station 105 may generate the codebook for the feedback messages. For example, the UE 115 may identify, for each uplink subslot, downlink transmissions that end in that subslot. Then, the UE 115 may transmit a feedback message (e.g., within an uplink subslot indicated by the subslot offset parameter) including feedback information associated with each downlink transmission ending in the subslot. In some examples, the UE 115 may be configured to provide feedback messages to the base station in cases that the uplink and downlink channels have different numerologies.

Figure 2:
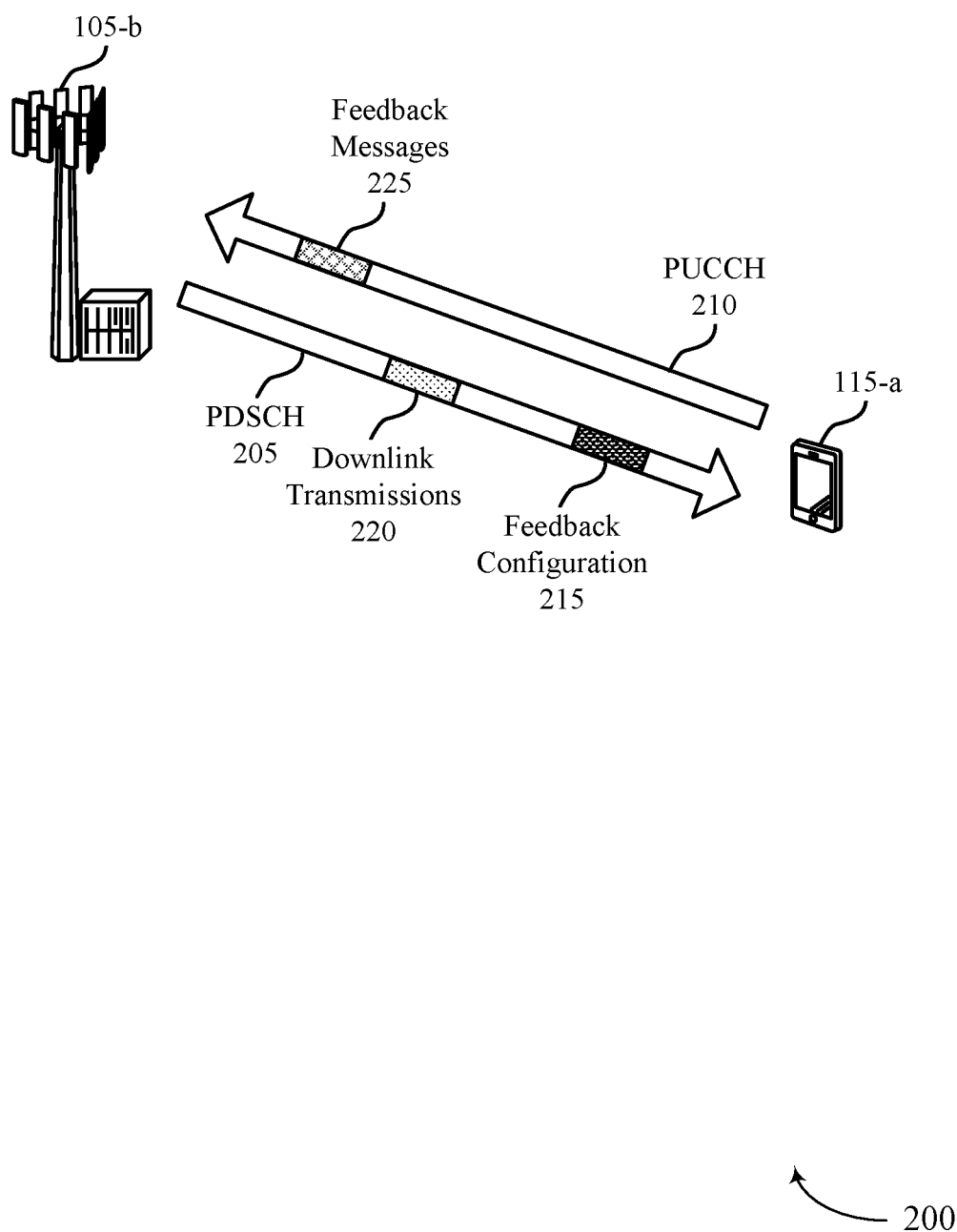
FIG. 2 illustrates an example of a wireless communications system that supports generating a feedback codebook in accordance with aspects of the present disclosure.

FIG. 2 illustrates an example of a wireless communications system 200 that supports generating a feedback codebook in accordance with aspects of the present disclosure. In some examples, the wireless communications system 200 may implement aspects of wireless communications system 100. Wireless communications system 200 includes base station 105-a and UE 115-a, which may be examples of corresponding devices described herein. Base station 105-a may transmit downlink signals to UE 115-a via PDSCH 205, and UE 115-a may transmit uplink signals to base station 105-a via PUCCH 210. Wireless communications system 200 may support communications between base station 105-a and UE 115-a using subslots. In the example of wireless communications system 200, UE 115-a may be configured to transmit subslot-based feedback messages associated with downlink transmissions 220.

Base station 105-a and UE 115-a may be in communication via PDSCH 205 and PUCCH 210. In some cases, PDSCH 205 and PUCCH 210 may have the same numerologies. In some other cases, PDSCH 205 and PUCCH 210 may have different numerologies. For example, the subslots of PDSCH 205 may have a different duration than the subslots of PUCCH 210. Base station 105-a may transmit, via PDSCH 205, an indication of feedback configuration 215 to UE 115-a. In some cases, base station 105-a may transmit the indication of feedback configuration 215 via RRC signaling. Feedback configuration 215 may indicate a configuration for transmitting feedback messages 225 via PUCCH 210. For example, feedback configuration 215 may indicate that feedback messages 225 are subslot-based feedback messages. That is, feedback configuration 215 may indicate that UE 115-a is to determine, for each uplink subslot, a set of downlink transmission occasions to generate feedback for. Additionally, feedback configuration 215 may indicate a subslot offset (e.g., K1) for feedback messages 225. The subslot offset may indicate an offset (e.g., a quantity of subslots of the PUCCH 210) between receipt of downlink transmissions 220 and transmission of feedback messages 225.

After base station 105-a transmits feedback configuration 215 to UE 115-a, base station 105-a and UE 115-a may generate a feedback codebook for feedback messages 225. Base station 105-a and UE 115-a may generate the feedback codebook according to a subslot-based codebook generation procedure (e.g., instead of a mixed numerology-based codebook generation procedure and independent of the numerologies of PDSCH 205 and PUCCH 210). That is, base station 105-a and UE 115-a may each identify, for each subslot of PUCCH 210, a quantity of downlink transmission opportunities (e.g., PDSCH transmission opportunities) ending within that subslot. In some cases, a subslot of PUCCH 210 may overlap with two slots of PDSCH 205. In some examples, base station 105-a and UE 115-a may generate the feedback codebook based on the numerologies for PDSCH 205 and PUCCH 210 being different. Here, base station 105-a and UE 115-a may each identify a quantity of downlink transmission opportunities in both slots of PDSCH 205 that end during the subslot of PUCCH 210. In either case, UE 115-a and base station 105-a may generate the feedback codebook based on the quantity of downlink transmission opportunities that end each subslot of PUCCH 210. Additionally, UE 115-a and base station 105-a may generate the feedback codebook for each possible subslot offset value.

When UE 115-a receives downlink transmissions 220 from base station 105-a, UE 115-a may be configured to transmit one or more feedback messages 225 associated with downlink transmissions 220 (e.g., based on receiving feedback configuration 215 and generating the feedback codebook). In some cases, each of the feedback messages 225 may correspond to one of the subslots of PUCCH 210 and may include feedback associated with the quantity of downlink transmission opportunities ending in that subslot of PUCCH 210.

Figure 3:
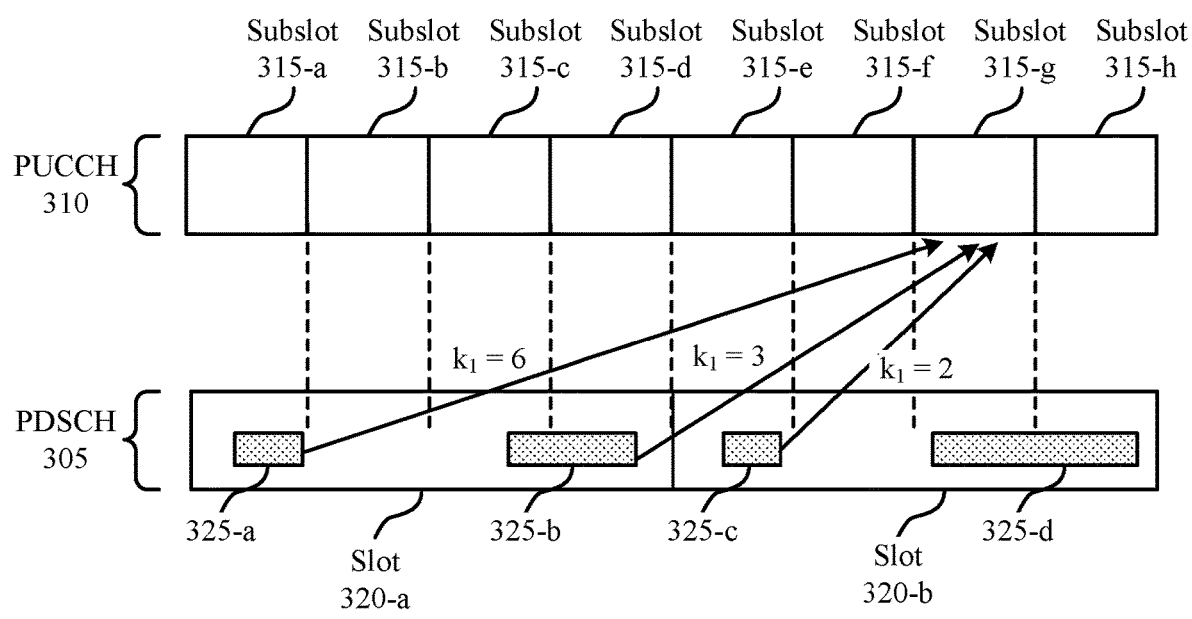
FIGS. 3 and 4 illustrate examples of feedback transmission schemes that support generating a feedback codebook in accordance with aspects of the present disclosure.

FIG. 3 illustrates an example of a feedback transmission scheme 300 that supports generating a feedback codebook in accordance with aspects of the present disclosure. In some examples, feedback transmission scheme 300 may implement aspects of wireless communications system 100 and wireless communications system 200. For example, feedback transmission scheme 300 may be implemented for a UE to provide subslot-based feedback messages via a PUCCH 310 associated with downlink transmissions (e.g., received via a PDSCH 305).

PDSCH 305 and PUCCH 310 may be configured for communications between a UE and a base station. In some examples, PUCCH 310 may include a set of subslots 315-a, 315-b, 315-c, 315-d, 315-e, 315-f, 315-g, and 315-h (e.g., uplink subslots) and PDSCH 305 may include a set of slots 320-a and 320-b. In the example of feedback transmission scheme 300, slots 320-a and 320-b of PDSCH 305 may have a first number of symbols, and subslots 315-a, 315-b, 315-c, 315-d, 315-e, 315-f, 315-g, and 315-h of PUCCH 310 may have a second number of symbols fewer than the first number of symbols. In some examples, each of the slots 320 may have more symbols than each of the subslots 315. For example, PUCCH 310 may have a subcarrier spacing twice that of PDSCH 305, and the length of each subslot 315 may be 7 OFDM symbols. Therefore, one slot of PUCCH 310 may contain two subslots 315.

PDSCH 305 may include a set of downlink transmission opportunities 325. For example, slot 320-a of PDSCH 305 may include downlink transmission opportunities 325-a and 325-b. Additionally, slot 320-b of PDSCH 305 may include downlink transmission opportunities 325-c and 325-d. In some cases, downlink transmission opportunities 325 may be slot-based downlink transmission opportunities. That is, the TDRA associated with each downlink transmission opportunity 325 may be defined with respect to slots 320. In some other cases, downlink transmission opportunities 325 may be subslot-based downlink transmission opportunities. That is, the TDRA associated with each downlink transmission opportunity 325 may be defined with respect to the subslots of PDSCH 305. After a UE receives an indication of a configuration for transmitting subslot-based feedback messages associated with downlink transmissions received via PDSCH 305, the UE and the base station may generate a feedback codebook based on the feedback messages being subslot-based. In some examples, the UE and the base station may generate the feedback codebook based on the numerologies of PDSCH 305 and PUCCH 310 being different. That is, the base station and the UE may identify, for each subslot 315 of PUCCH 310, a quantity of downlink transmission opportunities 325 ending during that subslot 315. For example, the base station and UE may identify that downlink transmission opportunity 325-a ends during subslot 315-a, downlink transmission opportunity 325-b ends during subslot 315-d, downlink transmission opportunity 325-c ends during subslot 315-e, and downlink transmission opportunity 325-d ends during subslot 315-h.

Based on the quantity of downlink transmission opportunities ending during each of the subslots 315, the UE and the base station may generate the feedback codebook. In some cases, the UE and the base station may generate the feedback codebook based on each possible subslot offset value (e.g., each possible K1 value). That is, if the UE is configured to perform a subslot-based feedback procedure (e.g., the UE is configured with an RRC parameter subslotLengthForPUCCH), the UE may not use the mixed numerology-based codebook generation procedure, but instead use the subslot-based codebook generation procedure. For example, the UE and the base station may determine for the UE to transmit a feedback message via subslot 315-g in cases that the subslot offset value is two, three, or six. That is, in a case that the subslot offset value is equal to six, the UE and the base station may determine that a feedback message including feedback associated with downlink transmission opportunity 325-a may be transmitted within subslot 315-g of PUCCH 310 (e.g., because subslot 315-g occurs six subslots after subslot 315-a that downlink transmission opportunity 325-a ends during). Additionally, in a case that the subslot offset value is equal to three, the UE and the base station may determine that a feedback message including feedback associated with downlink transmission opportunity 325-b may be transmitted within subslot 315-g. Additionally, in a case that the subslot offset value is equal to two, the UE and the base station may determine that a feedback message including feedback associated with downlink transmission opportunity 325-c may be transmitted within subslot 315-g. The UE and the base station may perform similar determinations for each subslot 315 of PUCCH 310.

Figure 4:
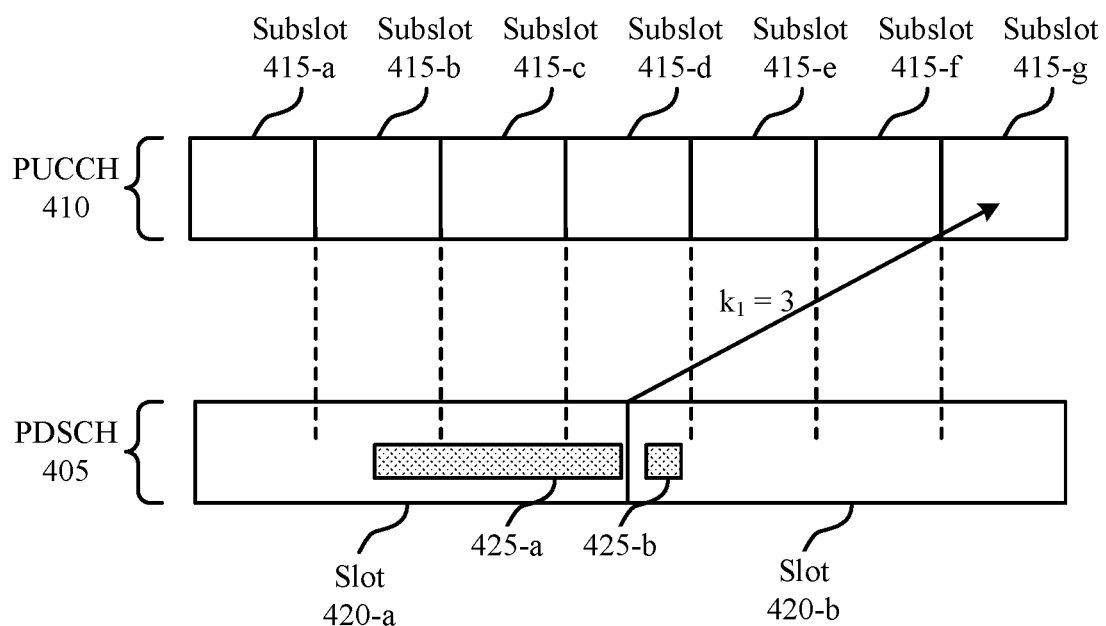

FIG. 4 illustrates an example of a feedback transmission scheme 400 that supports generating a feedback codebook in accordance with aspects of the present disclosure. In some examples, feedback transmission scheme 400 may implement aspects of wireless communications system 100 and wireless communications system 200. For example, feedback transmission scheme 400 may be implemented for a UE to provide subslot-based feedback messages via a PUCCH 410 associated with downlink transmissions (e.g., received via a PDSCH 405). Feedback transmission scheme 400 may illustrate an example of subslot-based feedback transmission in a case that one subslot 415 (e.g., a subslot 415-d) of PUCCH 410 overlaps with two slots 420 of PDSCH 405.

PDSCH 405 and PUCCH 410 may be configured for communications between a UE and a base station. In some examples, PUCCH 410 may include a set of subslots 415-a, 415-b, 415-c, 415-d, 415-e, 415-f, and 415-g, and PDSCH 405 may include a set of slots 420-a and 420-b. PDSCH 405 may include a set of downlink transmission opportunities 425. For example, slot 420-a of PDSCH 405 may include downlink transmission opportunities 425-a and slot 420-b of PDSCH 405 may include downlink transmission opportunities 425-b. After a UE receives an indication of a configuration for transmitting subslot-based feedback messages associated with downlink transmissions received via PDSCH 405, the UE and the base station may generate a feedback codebook based on the feedback messages being subslot-based. That is, the base station and the UE may identify, for each subslot 415 of PUCCH 410, a quantity of downlink transmission opportunities 425 ending during that subslot 415. In an example that one of the subslots 415 of PUCCH 410 overlaps (e.g., partially overlaps) with two slots 420 of PDSCH 405, the UE and the base station may determine a quantity of downlink transmission opportunities 425 within both slots 420-a and 420-b of PDSCH 405. For example, for each of the slots 420-a and 420-b that overlaps with subslot 415-d (e.g., starting with an earliest slot 420-a and then moving to the latest slot 420-b), the UE and the base station may determine whether that slot 420 includes a downlink transmission opportunity 425 ending during subslot 415-d. Here, the UE and the base station may determine that downlink transmission opportunities 425-a and 425-b end during subslot 415-d.

Based on the quantity of downlink transmission opportunities ending during each of the subslots 415, the UE and the base station may generate the feedback codebook. In some cases, the UE and the base station may generate the feedback codebook based on each possible subslot offset value (e.g., each possible K1 value). For example, the UE and the base station may determine, for a subslot offset value of three, to transmit a feedback message including feedback for downlink transmission opportunities 425-*a* and 425-*b* within subslot 415-*g*. That is, subslot 415-*g* occurs three subslots 415 after subslot 415-*d* (e.g., during which the downlink transmission opportunities 425-*a* and 425-*b* end). Feedback transmission scheme 400 illustrates an example K1 value of three, but the UE and the base station may additionally generate the feedback codebook for other subslot offset values.

Figure 5:
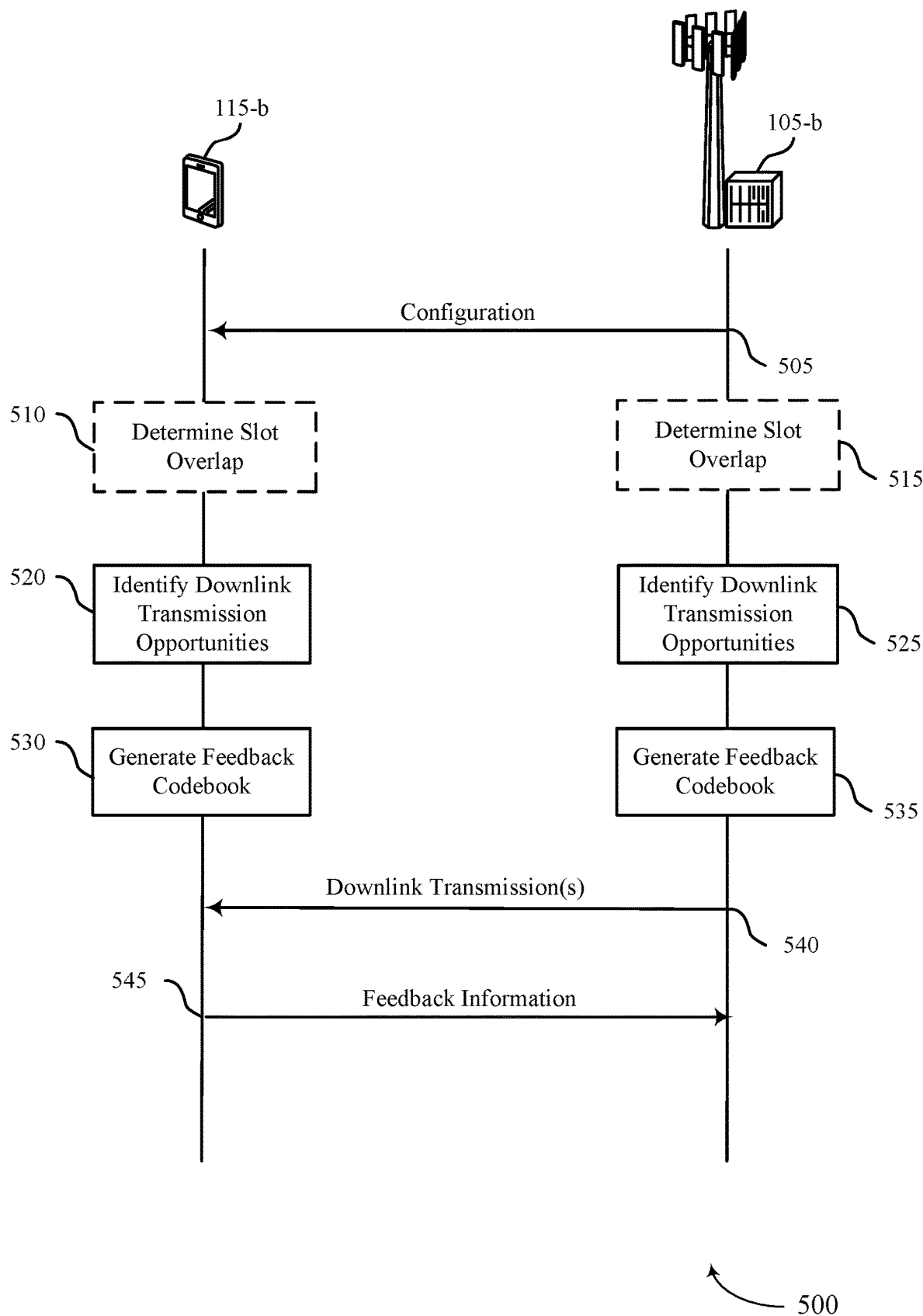
FIG. 5 illustrates an example of a process flow that supports generating a feedback codebook in accordance with aspects of the present disclosure.

FIG. 5 illustrates an example of a process flow 500 that supports generating a feedback codebook in accordance with aspects of the present disclosure. In some examples, the process flow 500 may implement one or more aspects of wireless communications systems 100 and 200. For example, process flow 500 may include a base station 105-*b* and a UE 115-*b*, which may be examples of corresponding wireless devices as described with reference to FIGS. 1 and 2. In the following description of process flow 500, the operations between base station 105-*b* and UE 115-*b* and the may be transmitted in a different order than the order shown, or the operations performed by UE 115-*b* and the base station 105-*b* may be performed in different orders or at different times. Some operations may also be omitted from process flow 500, and other operations may be added to process flow 500. Further, while FIG. 5 illustrates an example of communications between a base station 105-*b* and a UE 115-*b*, the techniques described herein may be applied to communications between any number of wireless devices.

At 505, UE 115-*b* may receive, from base station 105-*b*, an indication of a configuration for transmission in an uplink channel of one or more feedback messages associated with downlink transmissions received via a downlink channel (e.g., a PDSCH). The one or more feedback messages may be subslot-based transmissions in the uplink channel (e.g., a PUCCH). In some cases, each of the one or more feedback messages may correspond to one of multiple subslots. Additionally or alternatively, the configuration of one or more feedback messages may include a subslot offset between receipt of the downlink transmissions and transmissions of the one or more feedback messages, where transmitting the one or more feedback messages is based on the subslot offset. In some implementations, UE 115-*b* may receive RRC signaling indicating the configuration for transmission of the one or more feedback messages.

In some cases, at 510, UE 115-*b* may determine that a first slot of the downlink channel and a second slot of the downlink channel overlap with a subslot of the uplink channel (e.g., in cases that the subslot of the uplink channel overlaps with the first and second slots of the downlink channel). Additionally, base station 105-*b* may also determine that a first slot of the downlink channel and a second slot of the downlink channel overlap with a subslot of the uplink channel at 515.

At 520, UE 115-*b* may identify, for each subslot of the multiple subslots of the uplink channel, a first quantity of downlink transmission opportunities ending during a respective subslot of the multiple of subslots. In some cases, each of the one or more feedback messages may be associated with respective ones of the first quantity of downlink transmission opportunities ending during the respective subslot of the multiple subslots. In some cases, UE 115-*b* may identify, for each subset of multiple subslots of the uplink channel, one or more downlink transmission opportunities that overlap a respective subslot of the multiple subslots. Then, UE 115-*b* may identify, for each of the multiple subslots, a subset of the one or more downlink transmission opportunities ending during the respective subslot of the multiple subslots. In some other cases (e.g., in cases that the subslot of the uplink channel overlaps with the first and second slots of the downlink channel), UE 115-*b* may identify a first quantity of downlink transmission opportunities within the first slot of the downlink channel and a second quantity of downlink transmission opportunities within the second slot of the downlink channel ending during the subslot of the uplink channel based on determining that a first slot of the downlink channel and a second slot of the downlink channel overlap with a subslot of the uplink channel. In some examples, UE 115-*b* may identify a first quantity of slots of the downlink channel that overlap with a subslot of the uplink channel, where generating the feedback codebook is based on identifying the first quantity of slots.

At 525, base station 105-*b* may identify, for each of the multiple subslots of the uplink channel, a first quantity of downlink transmission opportunities ending during a respective subslot of the multiple subslots. In some cases, each of the one or more feedback messages may be associated with respective ones of the first quantity of downlink transmission opportunities ending during the respective subslot of the multiple subslots. In some cases, base station 105-*b* may identify, for each of the multiple subslots of the uplink channel, one or more downlink transmission opportunities that overlap a respective subslot of the multiple subslots. Here, base station 105-*b* may identify, for each of the multiple subslots, a subset of the one or more downlink transmission opportunities ending during the respective subslot of the multiple subslots. Additionally or alternatively, base station 105-*b* may identify a first quantity of downlink transmission opportunities within the first slot of the downlink channel and a second quantity of downlink transmission opportunities within the second slot of the downlink channel ending during the subslot of the uplink channel based on determining that a first slot of the downlink channel and a second slot of the downlink channel overlap with a subslot of the uplink channel.

At 530, UE 115-*b* may generate a feedback codebook for transmission of the one or more feedback messages based on one or more feedback messages being subslot-based transmissions and. In some cases, generating the feedback codebook may be based on the first quantity of the downlink transmission opportunities. In some cases, UE 115-*b* may generate the feedback codebook based on a first numerology associated with the downlink channel and a second numerology associated with the uplink channel being different. In some examples, UE 115-*b* may generate the feedback codebook independent of whether a first numerology associated with the downlink channel and a second numerology associated with the uplink channel are different. Additionally or alternatively, UE 115-*b* may generate the feedback codebook according to a subslot-based codebook generation procedure instead of according to a mixed numerology-based codebook generation procedure. In some other cases, UE 115-*b* may generate the feedback codebook based on a first quantity of downlink transmission opportunities within the subset of the one or more downlink transmission opportunities. In some cases, UE 115-*b* may generate the feedback codebook based on the first quantity of downlink transmission opportunities, where the first quantity of downlink transmission opportunities may be based on determining that a first slot of the downlink channel and a second slot of the downlink channel overlap with a subslot of the uplink channel. UE 115-*b* may generate the feedback codebook for transmission of one or more feedback messages for each possible subset offset of multiple possible subslot offsets including at least the subslot offset.

At 535, base station 105-*b* may generate a feedback codebook for transmission of the one or more feedback messages based on one or more feedback messages being subslot-based transmissions. In some cases, generating the feedback codebook may be based on the first quantity of the downlink transmission opportunities. In some cases, base station 105-*b* may generate the feedback codebook based on a first numerology associated with the downlink channel and a second numerology associated with the uplink channel being different. In some examples, base station 105-*b* may generate the feedback codebook independent of whether a first numerology associated with the downlink channel and a second numerology associated with the uplink channel are different. Additionally or alternatively, base station 105-*b* may generate the feedback codebook according to a subslot-based codebook generation procedure instead of according to a mixed numerology-based codebook generation procedure. In some other cases, base station 105-*b* may generate the feedback codebook based on a first quantity of downlink transmission opportunities within the subset of the one or more downlink transmission opportunities. In some cases, base station 105-*b* may generate the feedback codebook based on the first quantity of downlink transmission opportunities, where the first quantity of downlink transmission opportunities may be based on determining that a first slot of the downlink channel and a second slot of the downlink channel overlap with a subslot of the uplink channel. UE 115-*b* may generate the feedback codebook for transmission of one or more feedback messages for each possible subset offsets of multiple possible subslot offsets including at least the subslot offset.

At 540, UE 115-*b* may receive, via the downlink channel, one or more downlink transmissions from base station 105-*b*. For example, base station 105-*b* may transmit a first downlink transmission within a first slot of the downlink channel and a second downlink transmission within a second slot of the downlink channel, where both the first downlink transmission and the second downlink transmission end within a same subslot of the uplink channel. In some cases, UE 115-*b* may generate a feedback message for transmission via the uplink channel including feedback associated with the first and second downlink transmissions based on both the first and second downlink transmissions ending within the same subslot.

At 545, UE 115-*b* may transmit, to base station 105-*b*, one or more feedback messages based on the feedback codebook via the uplink channel. In some cases, UE 115-*b* may generate a feedback message for transmission via the uplink channel including feedback associated with the first and second downlink transmissions based on both the first and second downlink transmissions ending within the same subslot.

Figure 6:
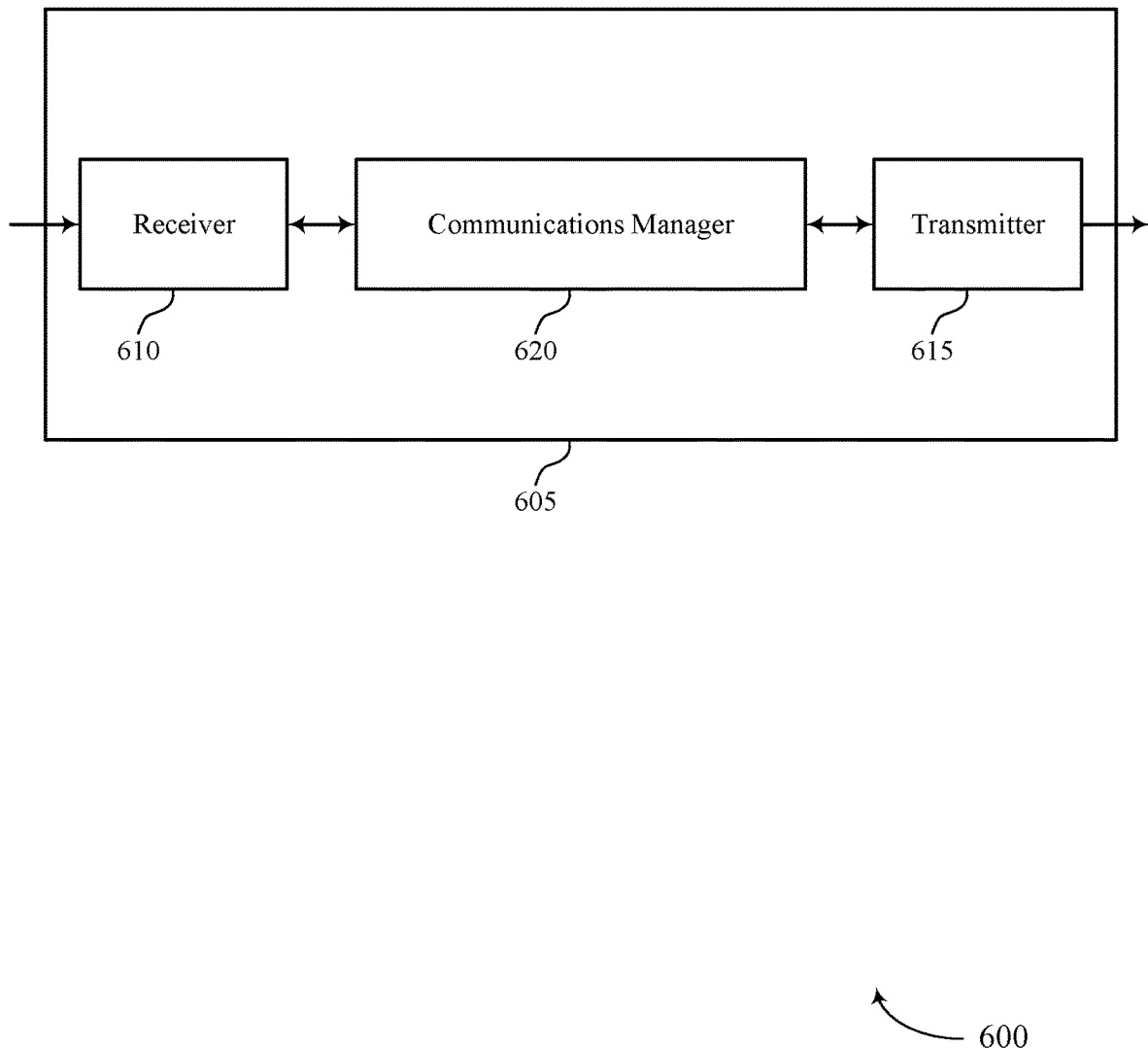
FIGS. 6 and 7 show block diagrams of devices that support generating a feedback codebook in accordance with aspects of the present disclosure.

FIG. 6 shows a block diagram 600 of a device 605 that supports generating a feedback codebook in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to generating a feedback codebook). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to generating a feedback codebook). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of generating a feedback codebook as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. For example, the communications manager 620 may be configured as or otherwise support a means for receiving, from a base station, an indication of a configuration for transmission in an uplink channel of one or more feedback messages associated with downlink transmissions received via a downlink channel, where the one or more feedback messages are subslot-based transmissions in the uplink channel. The communications manager 620 may be configured as or otherwise support a means for generating a feedback codebook for transmission of the one or more feedback messages based on the one or more feedback messages being subslot-based transmissions. The communications manager 620 may be configured as or otherwise support a means for transmitting, to the base station via the uplink channel, the one or more feedback messages in accordance with the feedback codebook.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for generating a feedback codebook which may improve reliability and resource efficiency, and decrease latency among other advantages. As such, supported techniques may include improved network operations and, in some examples, may promote network efficiencies, among other benefits.

Figure 7:
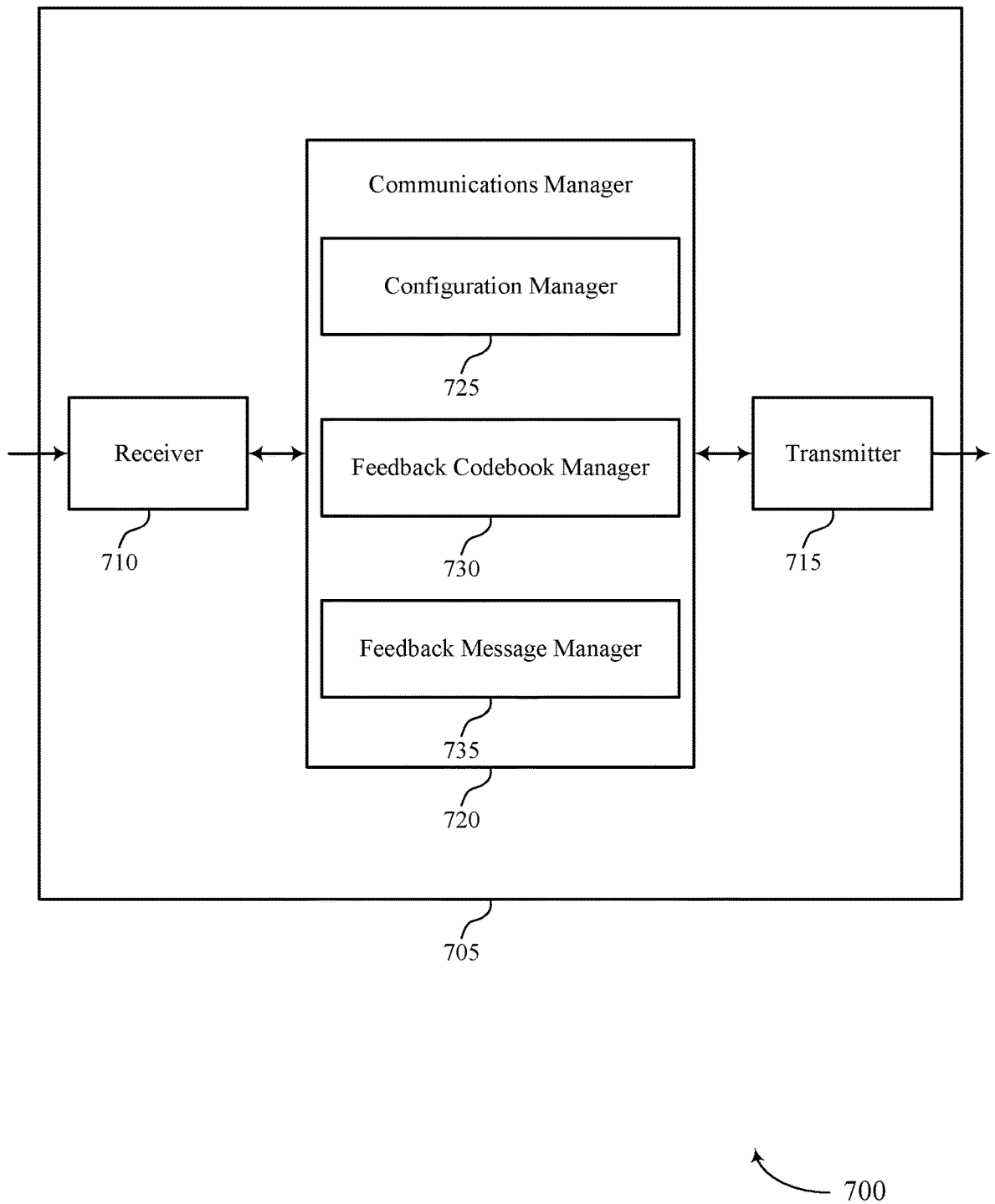

FIG. 7 shows a block diagram 700 of a device 705 that supports generating a feedback codebook in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to generating a feedback codebook). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to generating a feedback codebook). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of generating a feedback codebook as described herein. For example, the communications manager 720 may include a configuration manager 725, a feedback codebook manager 730, a feedback message manager 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. The configuration manager 725 may be configured as or otherwise support a means for receiving, from a base station, an indication of a configuration for transmission in an uplink channel of one or more feedback messages associated with downlink transmissions received via a downlink channel, where the one or more feedback messages are subslot-based transmissions in the uplink channel. The feedback codebook manager 730 may be configured as or otherwise support a means for generating a feedback codebook for transmission of the one or more feedback messages based on the one or more feedback messages being subslot-based transmissions. The feedback message manager 735 may be configured as or otherwise support a means for transmitting, to the base station via the uplink channel, the one or more feedback messages in accordance with the feedback codebook.

Figure 8:
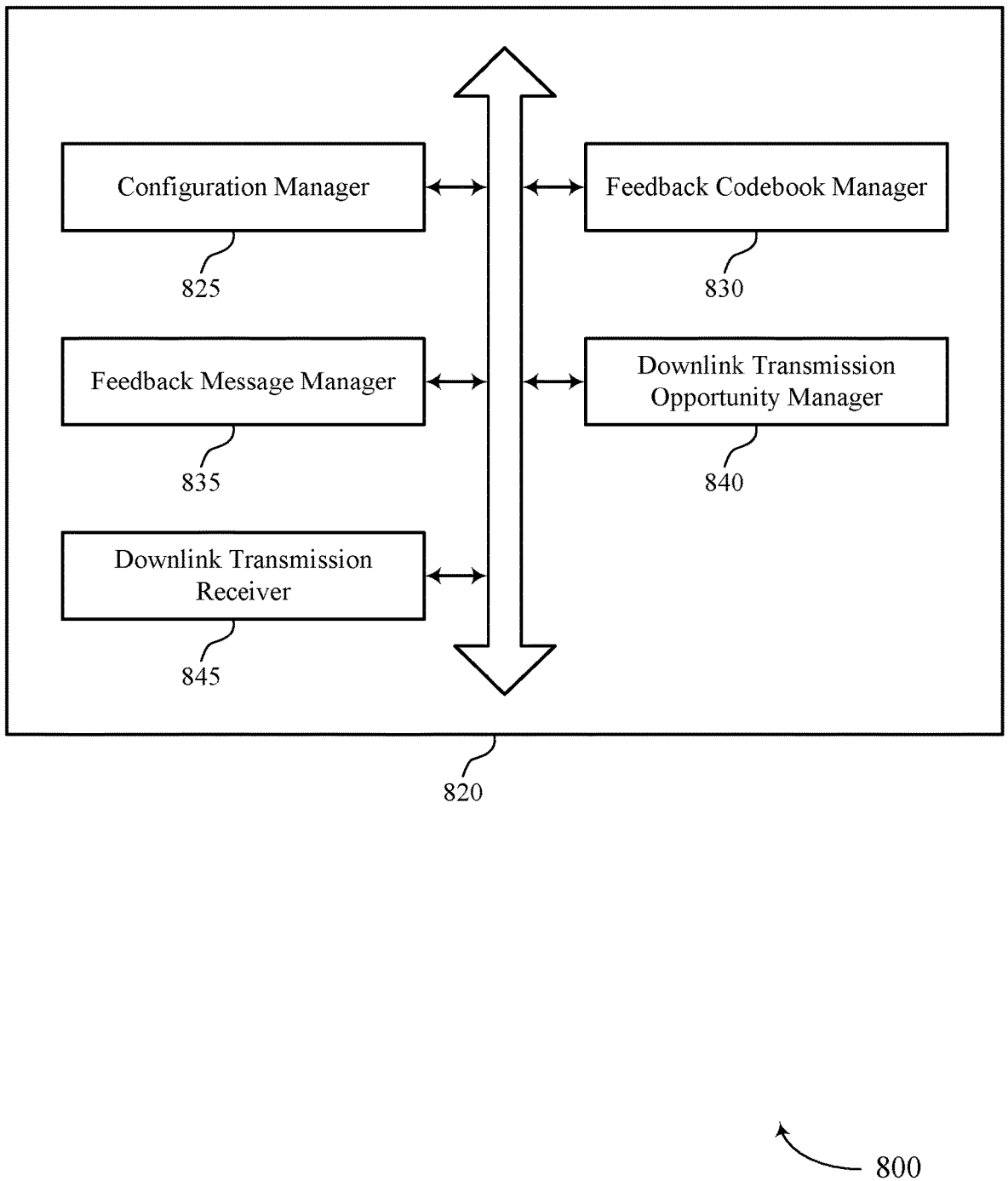
FIG. 8 shows a block diagram of a communications manager that supports generating a feedback codebook in accordance with aspects of the present disclosure.

FIG. 8 shows a block diagram 800 of a communications manager 820 that supports generating a feedback codebook in accordance with aspects of the present disclosure. The communications manager 820 may be an example of aspects of a communications manager 620, a communications manager 720, or both, as described herein. The communications manager 820, or various components thereof, may be an example of means for performing various aspects of generating a feedback codebook as described herein. For example, the communications manager 820 may include a configuration manager 825, a feedback codebook manager 830, a feedback message manager 835, a downlink transmission opportunity manager 840, a downlink transmission receiver 845, or any combination thereof. Each of these components may communicate, directly or indirectly, with one another (e.g., via one or more buses).

The communications manager 820 may support wireless communications at a UE in accordance with examples as disclosed herein. The configuration manager 825 may be configured as or otherwise support a means for receiving, from a base station, an indication of a configuration for transmission in an uplink channel of one or more feedback messages associated with downlink transmissions received via a downlink channel, where the one or more feedback messages are subslot-based transmissions in the uplink channel. The feedback codebook manager 830 may be configured as or otherwise support a means for generating a feedback codebook for transmission of the one or more feedback messages based on the one or more feedback messages being subslot-based transmissions. The feedback message manager 835 may be configured as or otherwise support a means for transmitting, to the base station via the uplink channel, the one or more feedback messages in accordance with the feedback codebook.

In some examples, the downlink transmission opportunity manager 840 may be configured as or otherwise support a means for identifying, for each of a set of multiple subslots of the uplink channel, a first quantity of downlink transmission opportunities ending during a respective subslot of the set of multiple subslots, where generating the feedback codebook is based on the first quantity of the downlink transmission opportunities.

In some examples, each of the one or more feedback messages corresponds to one of the set of multiple subslots and is associated with respective ones of the first quantity of downlink transmission opportunities ending during the respective subslot of the set of multiple subslots.

In some examples, to support generating the feedback codebook, the feedback codebook manager 830 may be configured as or otherwise support a means for generating the feedback codebook based on a first numerology associated with the downlink channel and a second numerology associated with the uplink channel being different In some examples, to support generating the feedback codebook, the feedback codebook manager 830 may be configured as or otherwise support a means for generating the feedback codebook independent of whether a first numerology associated with the downlink channel and a second numerology associated with the uplink channel are different.

In some examples, to support generating the feedback codebook, the feedback codebook manager 830 may be configured as or otherwise support a means for generating the feedback codebook according to a subslot-based codebook generation procedure instead of according to a mixed numerology-based codebook generation procedure.

In some examples, the downlink transmission opportunity manager 840 may be configured as or otherwise support a means for identifying, for each of a set of multiple subslots of the uplink channel, one or more downlink transmission opportunities that overlap a respective subslot of the set of multiple subslots. In some examples, the downlink transmission opportunity manager 840 may be configured as or otherwise support a means for identifying, for each of the set of multiple subslots, a subset of the one or more downlink transmission opportunities ending during the respective subslot of the set of multiple subslots, where generating the feedback codebook is based on a first quantity of downlink transmission opportunities within the subset of the one or more downlink transmission opportunities.

In some examples, the downlink transmission receiver 845 may be configured as or otherwise support a means for receiving, via the downlink channel, a first downlink transmission within a first slot of the downlink channel and a second downlink transmission within a second slot of the downlink channel, where both the first downlink transmission and the second downlink transmission end within a same subslot of the uplink channel. In some examples, the feedback message manager 835 may be configured as or otherwise support a means for generating a feedback message for transmission via the uplink channel including feedback associated with the first and second downlink transmissions based on both the first and second downlink transmissions ending within the same subslot.

In some examples, the downlink transmission opportunity manager 840 may be configured as or otherwise support a means for determining that a first slot of the downlink channel and a second slot of the downlink channel overlap with a subslot of the uplink channel. In some examples, the downlink transmission opportunity manager 840 may be configured as or otherwise support a means for identifying, based on the determining, a first quantity of downlink transmission opportunities within the first slot of the downlink channel and a second quantity of downlink transmission opportunities within the second slot of the downlink channel ending during the subslot of the uplink channel, where generating the feedback codebook is based on the first quantity of downlink transmission opportunities and the second quantity of downlink transmission opportunities. In some examples, the downlink transmission opportunity manager 840 may be configured as or otherwise support a means for identifying a first quantity of slots of the downlink channel that overlap with a subslot of the uplink channel, where generating the feedback codebook is based on identifying the first quantity of slots.

In some examples, the configuration of the one or more feedback messages includes a subslot offset between receipt of the downlink transmissions and transmission of the one or more feedback messages. In some examples, transmitting the one or more feedback messages is based on the subslot offset.

In some examples, to support generating the feedback codebook, the feedback codebook manager 830 may be configured as or otherwise support a means for generating the feedback codebook for transmission of the one or more feedback messages for each of a set of multiple possible subslot offsets including at least the subslot offset.

In some examples, to support receiving the configuration, the configuration manager 825 may be configured as or otherwise support a means for receiving RRC signaling indicating the configuration for transmission of the one or more feedback messages.

In some examples, slots of the downlink channel are first TTIs each having a first number of symbols. In some examples, subslots of the uplink channel are second TTIs each with fewer than the first number of symbols.

Figure 9:
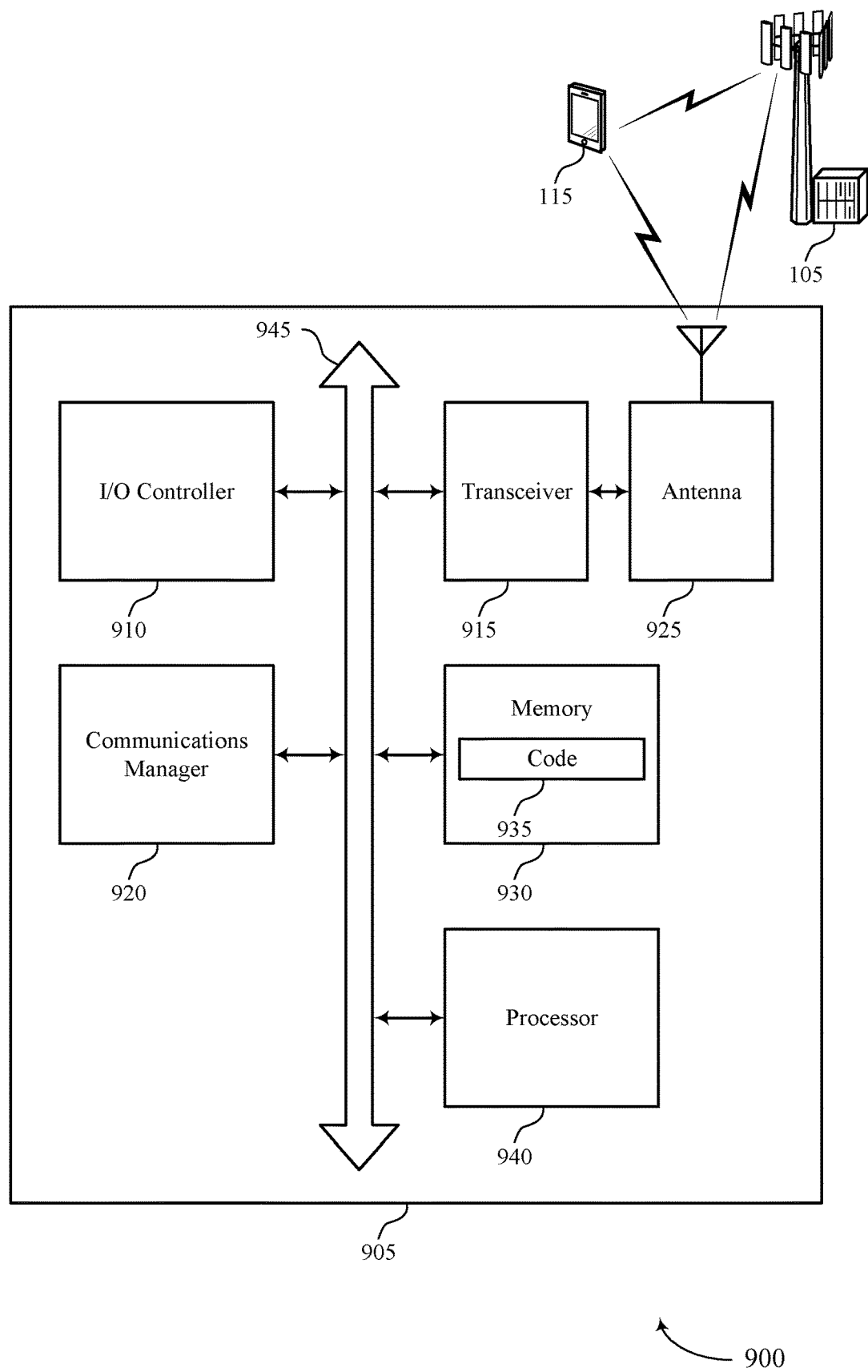
FIG. 9 shows a diagram of a system including a device that supports generating a feedback codebook in accordance with aspects of the present disclosure.

FIG. 9 shows a diagram of a system 900 including a device 905 that supports generating a feedback codebook in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting generating a feedback codebook). For example, the device 905 or a component of the device 905 may include a processor 940 and memory 930 coupled with the processor 940, the processor 940 and memory 930 configured to perform various functions described herein.

The communications manager 920 may support wireless communications at a UE in accordance with examples as disclosed herein. For example, the communications manager 920 may be configured as or otherwise support a means for receiving, from a base station, an indication of a configuration for transmission in an uplink channel of one or more feedback messages associated with downlink transmissions received via a downlink channel, where the one or more feedback messages are subslot-based transmissions in the uplink channel. The communications manager 920 may be configured as or otherwise support a means for generating a feedback codebook for transmission of the one or more feedback messages based on the one or more feedback messages being subslot-based transmissions. The communications manager 920 may be configured as or otherwise support a means for transmitting, to the base station via the uplink channel, the one or more feedback messages in accordance with the feedback codebook.

By including or configuring the communications manager 920 in accordance with examples as described herein, the device 905 may support techniques for generating a feedback codebook which may improve reliability and resource efficiency, and decrease latency among other advantages. As such, supported techniques may include improved network operations and, in some examples, may promote network efficiencies, among other benefits.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of generating a feedback codebook as described herein, or the processor 940 and the memory 930 may be otherwise configured to perform or support such operations.

Figure 10:
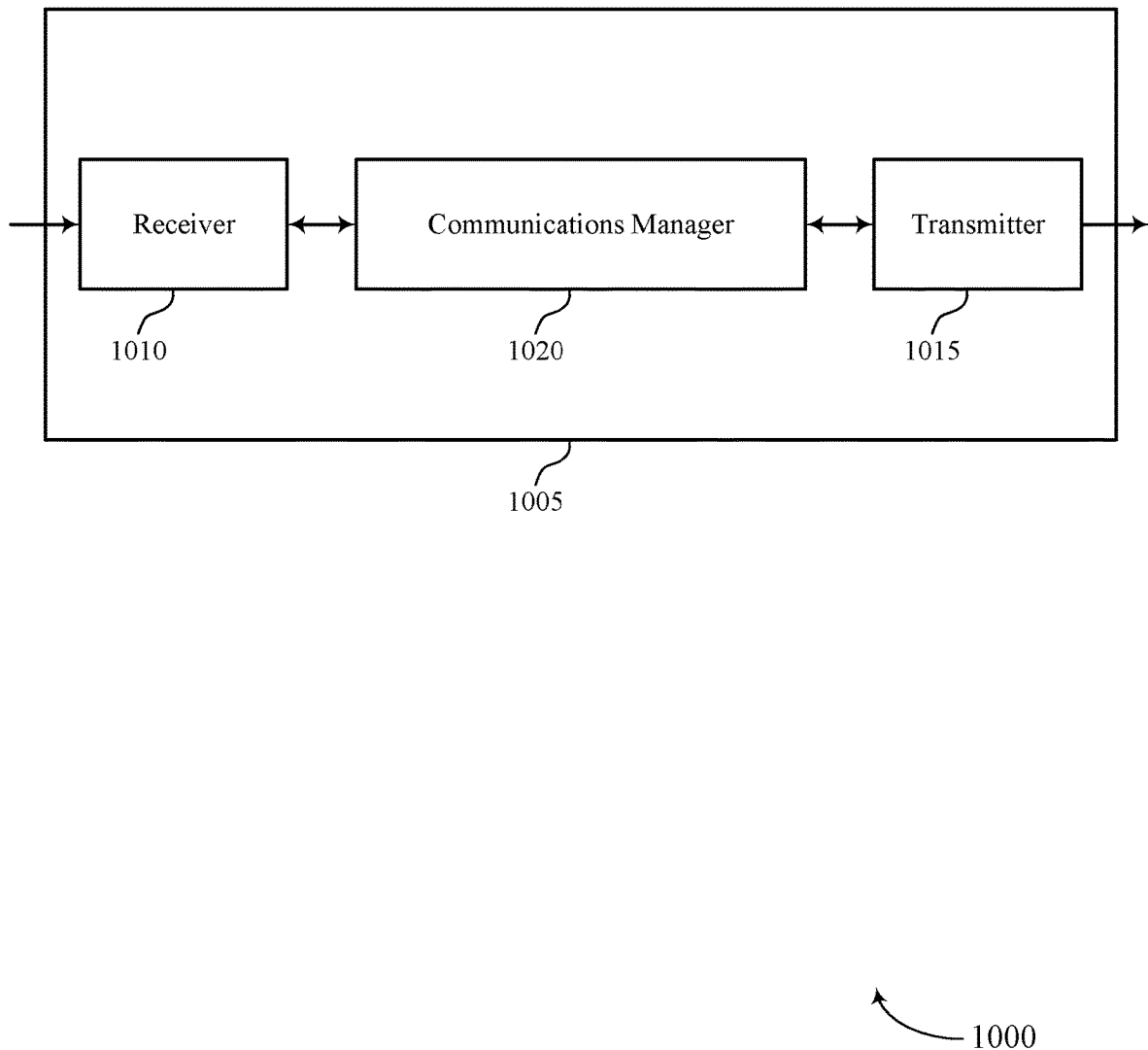
FIGS. 10 and 11 show block diagrams of devices that support generating a feedback codebook in accordance with aspects of the present disclosure.

FIG. 10 shows a block diagram 1000 of a device 1005 that supports generating a feedback codebook in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to generating a feedback codebook). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to generating a feedback codebook). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of generating a feedback codebook as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. For example, the communications manager 1020 may be configured as or otherwise support a means for transmitting, to a UE, an indication of a configuration for transmission in an uplink channel of one or more feedback messages associated with downlink transmissions received via a downlink channel, where the one or more feedback messages are subslot-based transmissions in the uplink channel. The communications manager 1020 may be configured as or otherwise support a means for generating a feedback codebook for transmission of the one or more feedback messages based on the one or more feedback messages being subslot-based transmissions. The communications manager 1020 may be configured as or otherwise support a means for receiving, from the UE via the uplink channel, the one or more feedback messages in accordance with the feedback codebook.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for generating a feedback codebook which may improve reliability and resource efficiency, and decrease latency among other advantages. As such, supported techniques may include improved network operations and, in some examples, may promote network efficiencies, among other benefits.

Figure 11:
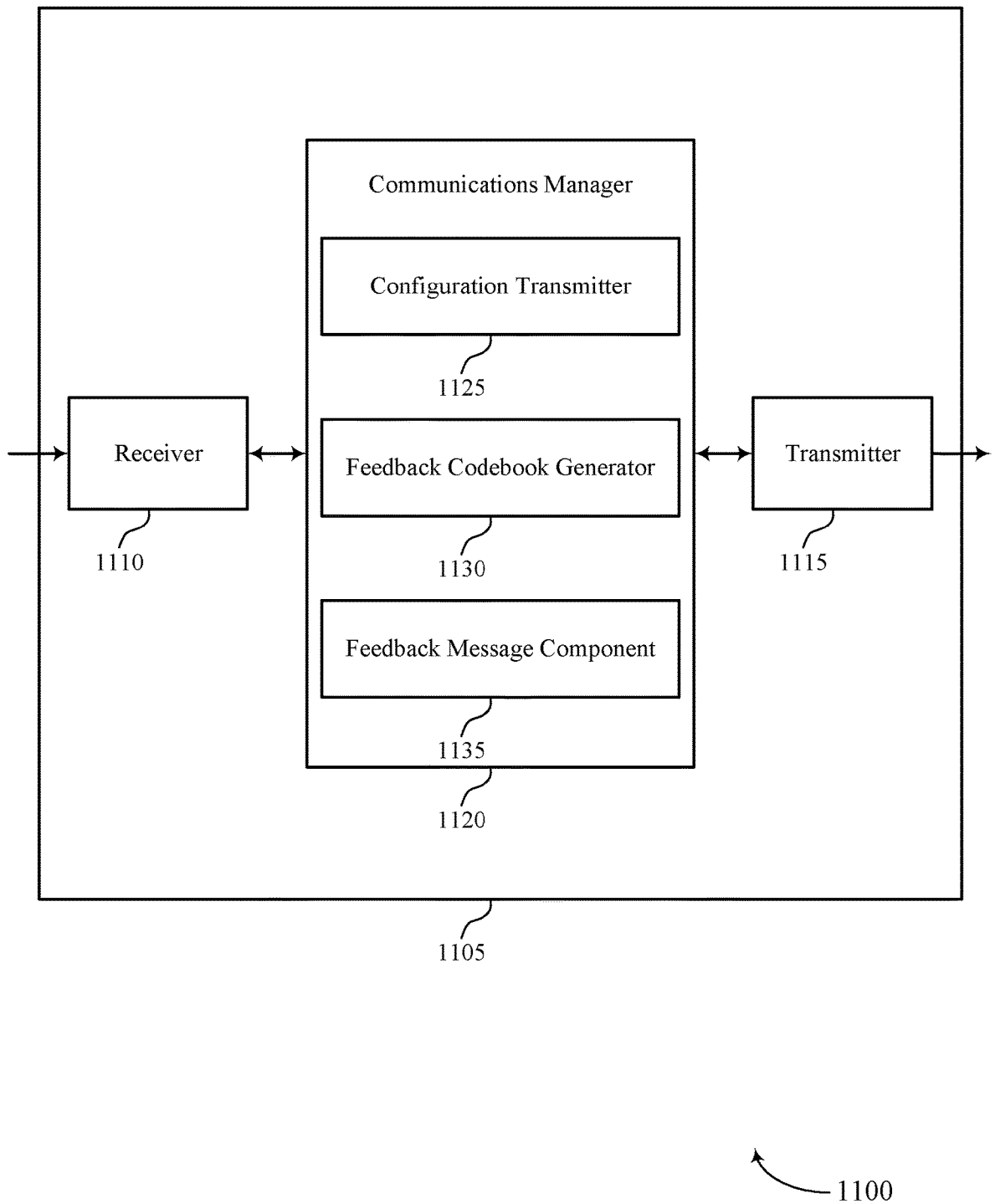

FIG. 11 shows a block diagram 1100 of a device 1105 that supports generating a feedback codebook in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to generating a feedback codebook). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to generating a feedback codebook). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of generating a feedback codebook as described herein. For example, the communications manager 1120 may include a configuration transmitter 1125, a feedback codebook generator 1130, a feedback message component 1135, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a base station in accordance with examples as disclosed herein. The configuration transmitter 1125 may be configured as or otherwise support a means for transmitting, to a UE, an indication of a configuration for transmission in an uplink channel of one or more feedback messages associated with downlink transmissions received via a downlink channel, where the one or more feedback messages are subslot-based transmissions in the uplink channel. The feedback codebook generator 1130 may be configured as or otherwise support a means for generating a feedback codebook for transmission of the one or more feedback messages based on the one or more feedback messages being subslot-based transmissions. The feedback message component 1135 may be configured as or otherwise support a means for receiving, from the UE via the uplink channel, the one or more feedback messages in accordance with the feedback codebook.

Figure 12:
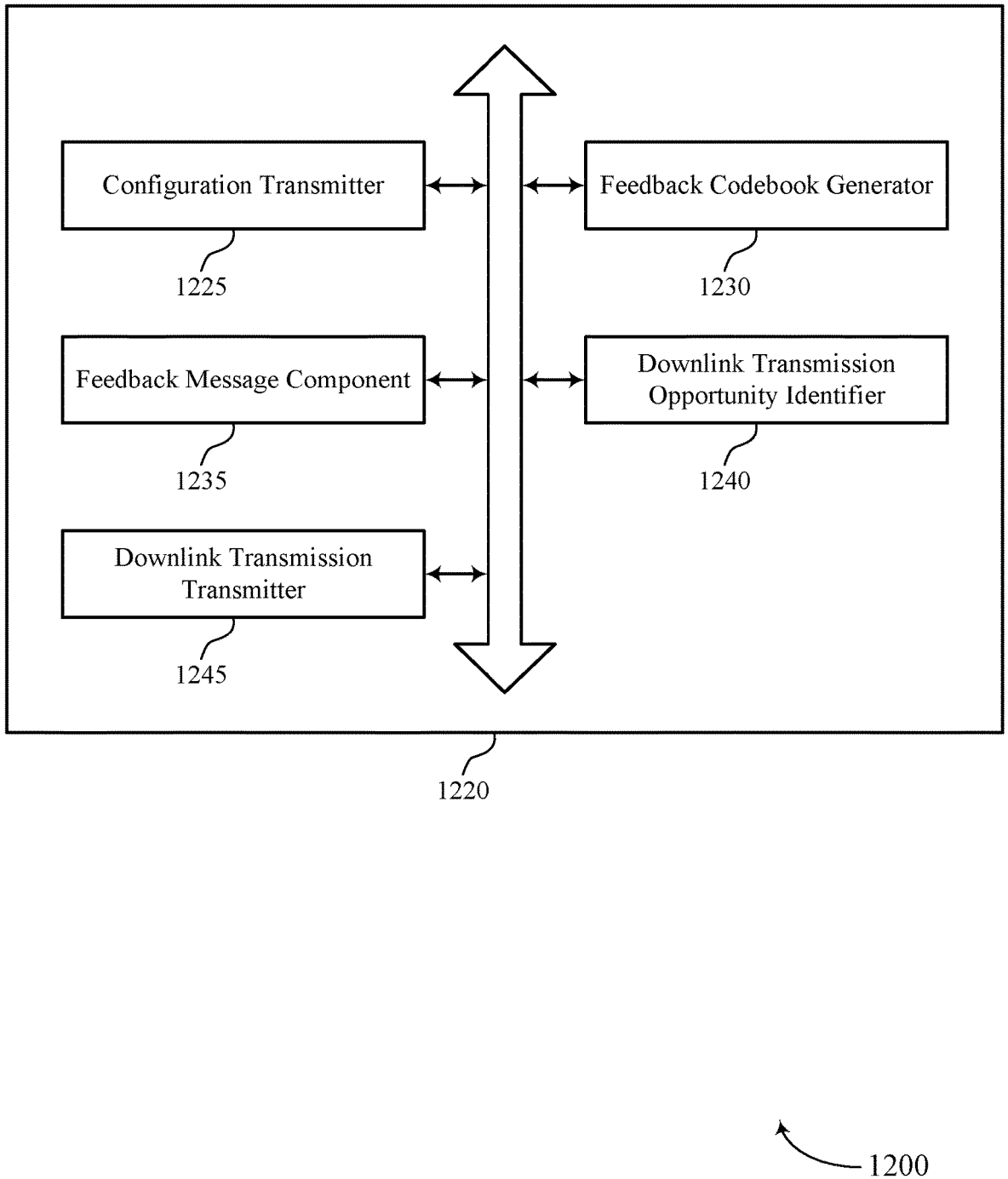
FIG. 12 shows a block diagram of a communications manager that supports generating a feedback codebook in accordance with aspects of the present disclosure.

FIG. 12 shows a block diagram 1200 of a communications manager 1220 that supports generating a feedback codebook in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of generating a feedback codebook as described herein. For example, the communications manager 1220 may include a configuration transmitter 1225, a feedback codebook generator 1230, a feedback message component 1235, a downlink transmission opportunity identifier 1240, a downlink transmission transmitter 1245, or any combination thereof. Each of these components may communicate, directly or indirectly, with one another (e.g., via one or more buses).

The communications manager 1220 may support wireless communications at a base station in accordance with examples as disclosed herein. The configuration transmitter 1225 may be configured as or otherwise support a means for transmitting, to a UE, an indication of a configuration for transmission in an uplink channel of one or more feedback messages associated with downlink transmissions received via a downlink channel, where the one or more feedback messages are subslot-based transmissions in the uplink channel. The feedback codebook generator 1230 may be configured as or otherwise support a means for generating a feedback codebook for transmission of the one or more feedback messages based on the one or more feedback messages being subslot-based transmissions. The feedback message component 1235 may be configured as or otherwise support a means for receiving, from the UE via the uplink channel, the one or more feedback messages in accordance with the feedback codebook.

In some examples, the downlink transmission opportunity identifier 1240 may be configured as or otherwise support a means for identifying, for each of a set of multiple subslots of the uplink channel, a first quantity of the downlink transmission opportunities ending during a respective subslot of the set of multiple subslots, where generating the feedback codebook is based on the first quantity of the downlink transmission opportunities.

In some examples, each of the one or more feedback messages corresponds to one of the set of multiple subslots and is associated with respective ones of the first quantity of downlink transmission opportunities ending during the respective subslot of the set of multiple subslots.

In some examples, to support generating the feedback codebook, the feedback codebook generator 1230 may be configured as or otherwise support a means for generating the feedback codebook based on a first numerology associated with the downlink channel and a second numerology associated with the uplink channel being different.

In some examples, to support generating the feedback codebook, the feedback codebook generator 1230 may be configured as or otherwise support a means for generating the feedback codebook independent of whether a first numerology associated with the downlink channel and a second numerology associated with the uplink channel are different.

In some examples, to support generating the feedback codebook, the feedback codebook generator 1230 may be configured as or otherwise support a means for generating the feedback codebook according to a subslot-based codebook generation procedure instead of according to a mixed numerology-based codebook generation procedure.

In some examples, the downlink transmission opportunity identifier 1240 may be configured as or otherwise support a means for identifying, for each of a set of multiple subslots of the uplink channel, one or more downlink transmission opportunities that overlap a respective subslot of the set of multiple subslots. In some examples, the downlink transmission opportunity identifier 1240 may be configured as or otherwise support a means for identifying, for each of the set of multiple subslots, a subset of the one or more downlink transmission opportunities ending during the respective subslot of the set of multiple subslots, where generating the feedback codebook is based on a first quantity of downlink transmission opportunities within the subset of the one or more downlink transmission opportunities.

In some examples, the downlink transmission transmitter 1245 may be configured as or otherwise support a means for transmitting, via the downlink channel, a first downlink transmission within a first slot of the downlink channel and a second downlink transmission within a second slot of the downlink channel, where both the first downlink transmission and the second downlink transmission end within a same subslot of the uplink channel, where one of the one or more feedback messages includes feedback associated with the first and second downlink transmissions based on both the first and second downlink transmissions ending within the same subslot.

In some examples, the downlink transmission opportunity identifier 1240 may be configured as or otherwise support a means for determining that a first slot of the downlink channel and a second slot of the downlink channel overlap with a subslot of the uplink channel. In some examples, the downlink transmission opportunity identifier 1240 may be configured as or otherwise support a means for identifying, based on the determining, a first quantity of downlink transmission opportunities within the first slot of the downlink channel and a second quantity of downlink transmission opportunities within the second slot of the downlink channel ending during the subslot of the uplink channel, where generating the feedback codebook is based on the first quantity of downlink transmission opportunities and the second quantity of downlink transmission opportunities. In some examples, the downlink transmission opportunity identifier 1240 may be configured as or otherwise support a means for identifying a first quantity of slots of the downlink channel that overlap with a subslot of the uplink channel, where generating the feedback codebook is based on identifying the first quantity of slots.

In some examples, the configuration of the one or more feedback messages includes a subslot offset between receipt of the downlink transmissions and transmission of the one or more feedback messages. In some examples, receiving the one or more feedback messages is based on the subslot offset.

In some examples, to support generating the feedback codebook, the feedback codebook generator 1230 may be configured as or otherwise support a means for generating the feedback codebook for transmission of the one or more feedback messages for each of a set of multiple possible subslot offsets including at least the subslot offset.

In some examples, to support transmitting the configuration, the configuration transmitter 1225 may be configured as or otherwise support a means for receiving RRC signaling indicating the configuration for transmission of the one or more feedback messages.

In some examples, slots of the downlink channel are first TTIs each having a first number of symbols. In some examples, subslots of the uplink channel are second TTIs each with fewer than the first number of symbols.

Figure 13:
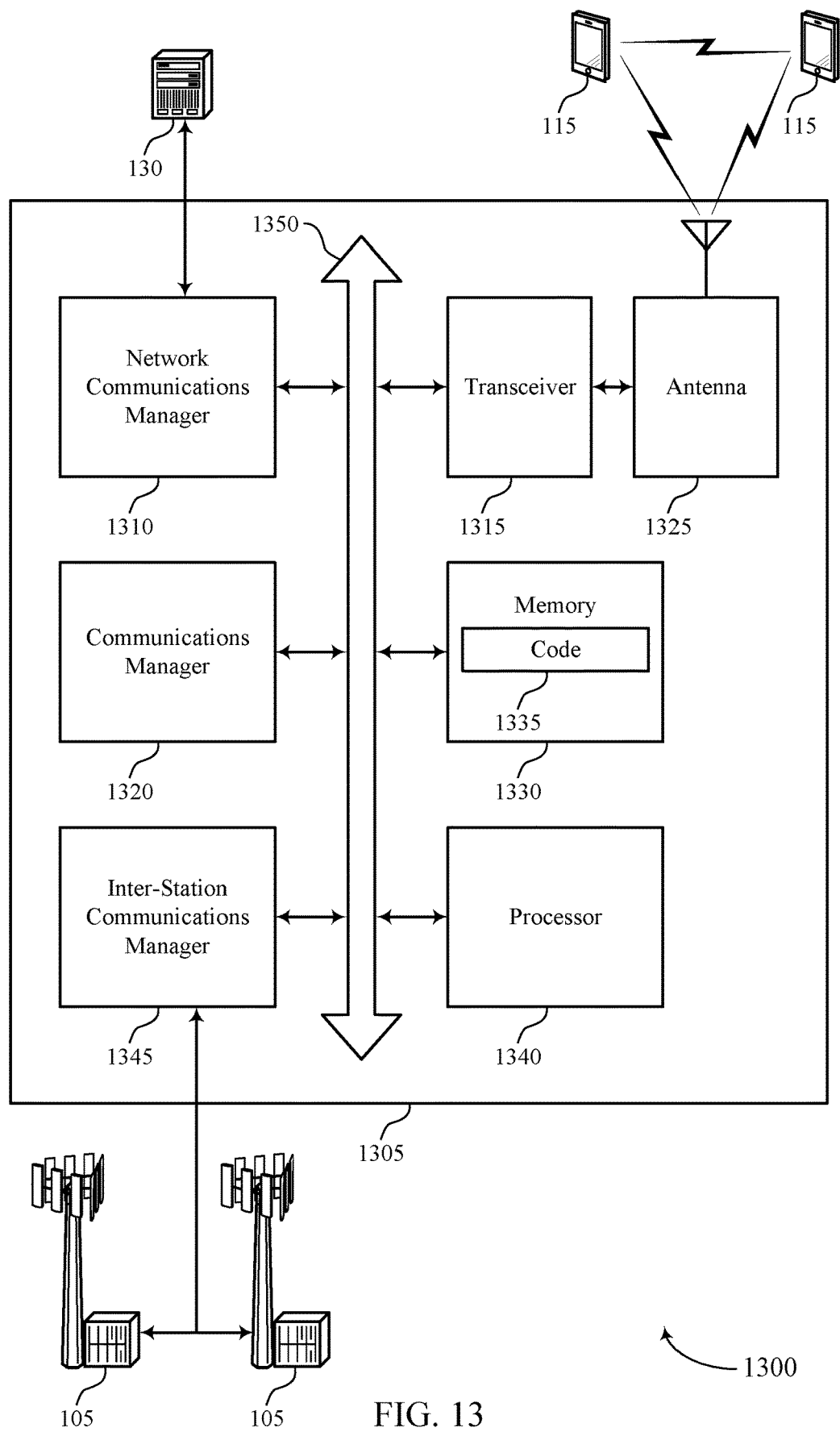
FIG. 13 shows a diagram of a system including a device that supports generating a feedback codebook in accordance with aspects of the present disclosure.

FIG. 13 shows a diagram of a system 1300 including a device 1305 that supports generating a feedback codebook in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting generating a feedback codebook). For example, the device 1305 or a component of the device 1305 may include a processor 1340 and memory 1330 coupled with the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communications at a base station in accordance with examples as disclosed herein. For example, the communications manager 1320 may be configured as or otherwise support a means for transmitting, to a UE, an indication of a configuration for transmission in an uplink channel of one or more feedback messages associated with downlink transmissions received via a downlink channel, where the one or more feedback messages are subslot-based transmissions in the uplink channel. The communications manager 1320 may be configured as or otherwise support a means for generating a feedback codebook for transmission of the one or more feedback messages based on the one or more feedback messages being subslot-based transmissions. The communications manager 1320 may be configured as or otherwise support a means for receiving, from the UE via the uplink channel, the one or more feedback messages in accordance with the feedback codebook.

By including or configuring the communications manager 1320 in accordance with examples as described herein, the device 1305 may support techniques for generating a feedback codebook which may improve reliability and resource efficiency, and decrease latency among other advantages. As such, supported techniques may include improved network operations and, in some examples, may promote network efficiencies, among other benefits.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of generating a feedback codebook as described herein, or the processor 1340 and the memory 1330 may be otherwise configured to perform or support such operations.

Figure 14:
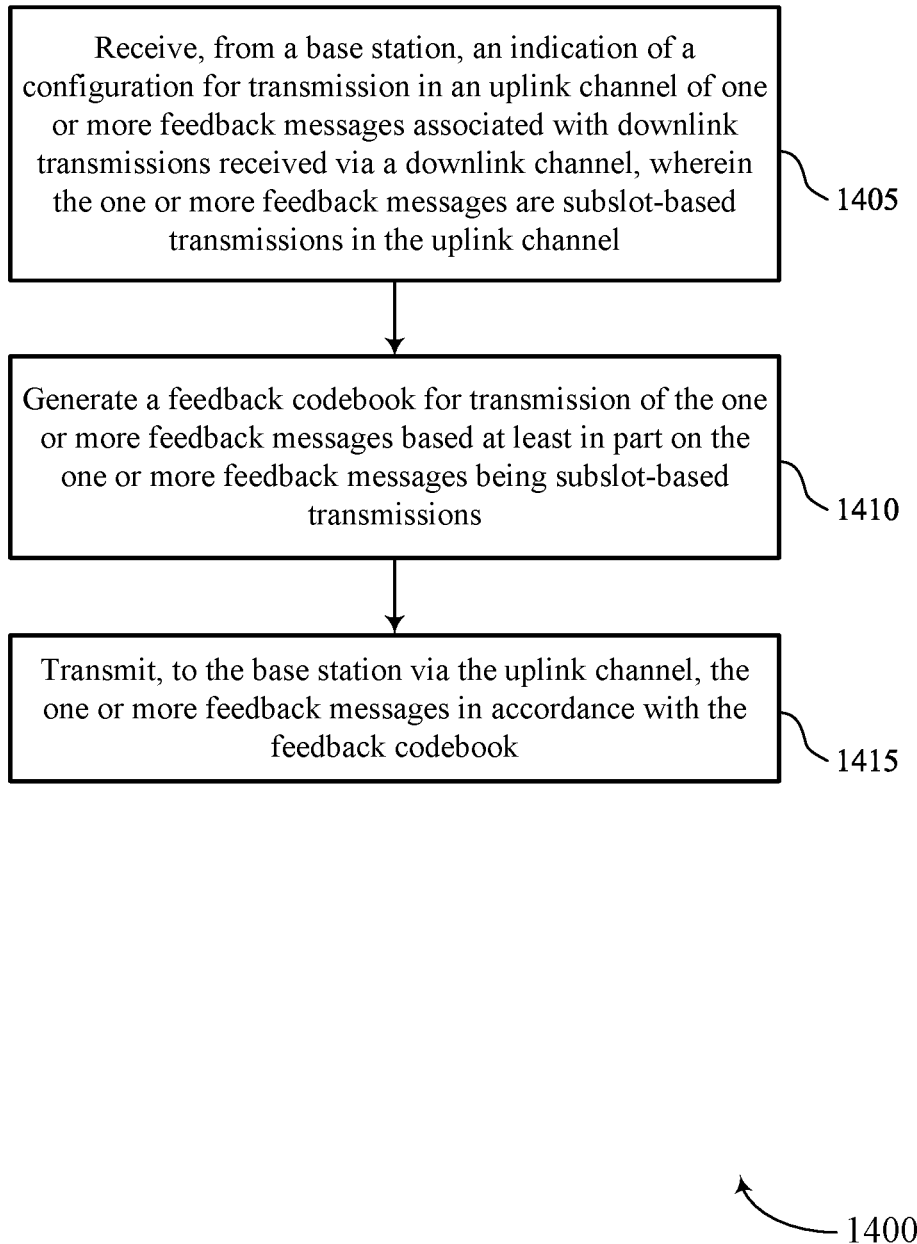
FIGS. 14 through 19 show flowcharts illustrating methods that support generating a feedback codebook in accordance with aspects of the present disclosure.

FIG. 14 shows a flowchart illustrating a method 1400 that supports generating a feedback codebook in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, an indication of a configuration for transmission in an uplink channel of one or more feedback messages associated with downlink transmissions received via a downlink channel, where the one or more feedback messages are subslot-based transmissions in the uplink channel. The operations of 1405 may be performed in accordance with examples as disclosed herein. In some examples, aspects of the operations of 1405 may be performed by a configuration manager 825 as described with reference to FIG. 8.

At 1410, the method may include generating a feedback codebook for transmission of the one or more feedback messages based on the one or more feedback messages being subslot-based transmissions. The operations of 1410 may be performed in accordance with examples as disclosed herein. In some examples, aspects of the operations of 1410 may be performed by a feedback codebook manager 830 as described with reference to FIG. 8.

At 1415, the method may include transmitting, to the base station via the uplink channel, the one or more feedback messages in accordance with the feedback codebook. The operations of 1415 may be performed in accordance with examples as disclosed herein. In some examples, aspects of the operations of 1415 may be performed by a feedback message manager 835 as described with reference to FIG. 8.

Figure 15:
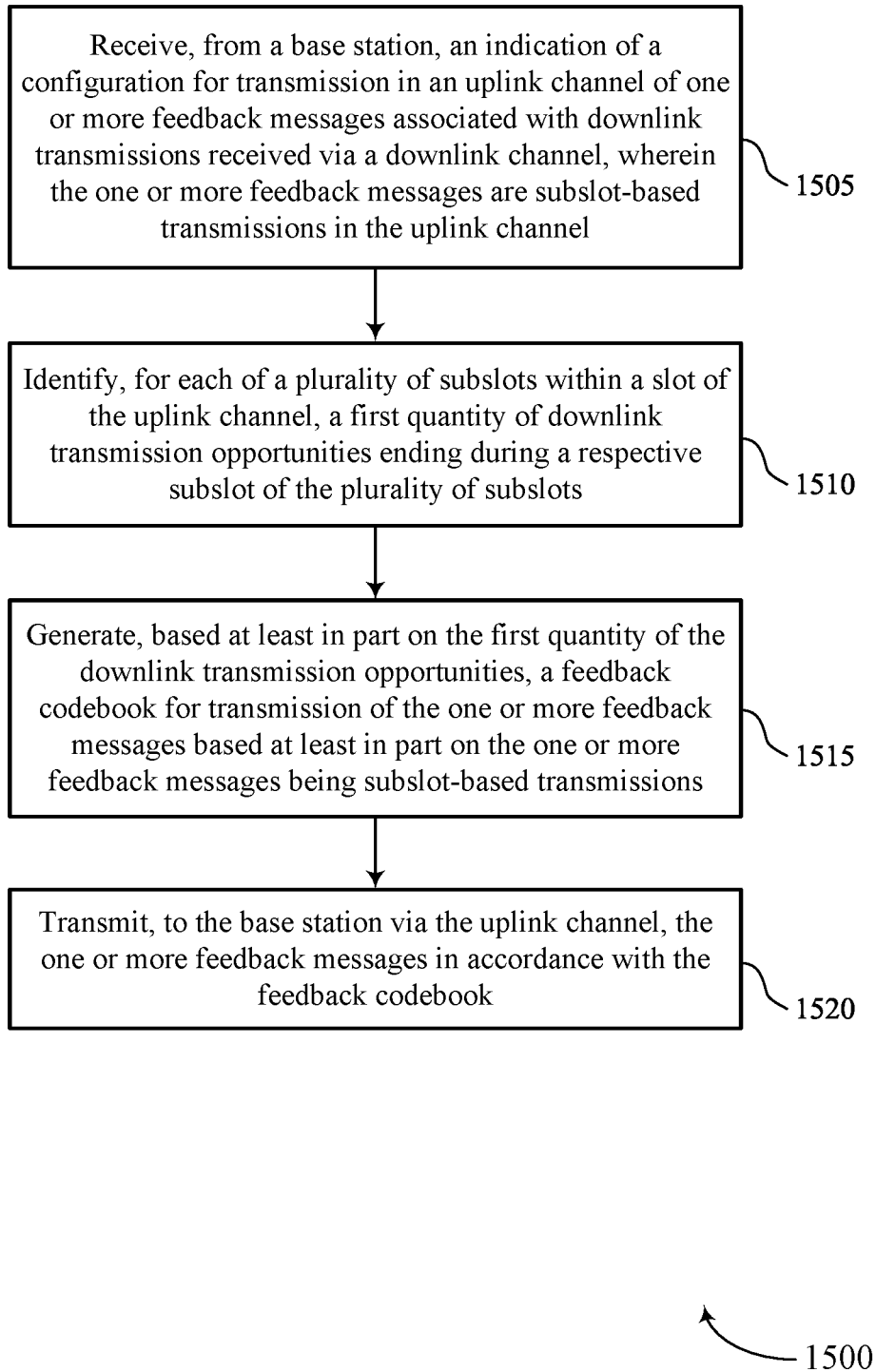

FIG. 15 shows a flowchart illustrating a method 1500 that supports generating a feedback codebook in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, an indication of a configuration for transmission in an uplink channel of one or more feedback messages associated with downlink transmissions received via a downlink channel, where the one or more feedback messages are subslot-based transmissions in the uplink channel. The operations of 1505 may be performed in accordance with examples as disclosed herein. In some examples, aspects of the operations of 1505 may be performed by a configuration manager 825 as described with reference to FIG. 8.

At 1510, the method may include identifying, for each of a set of multiple subslots of the uplink channel, a first quantity of downlink transmission opportunities ending during a respective subslot of the set of multiple subslots. The operations of 1510 may be performed in accordance with examples as disclosed herein. In some examples, aspects of the operations of 1510 may be performed by a downlink transmission opportunity manager 840 as described with reference to FIG. 8.

At 1515, the method may include generating, based on the first quantity of the downlink transmission opportunities, a feedback codebook for transmission of the one or more feedback messages based on the one or more feedback messages being subslot-based transmissions. The operations of 1515 may be performed in accordance with examples as disclosed herein. In some examples, aspects of the operations of 1515 may be performed by a feedback codebook manager 830 as described with reference to FIG. 8.

At 1520, the method may include transmitting, to the base station via the uplink channel, the one or more feedback messages in accordance with the feedback codebook. The operations of 1520 may be performed in accordance with examples as disclosed herein. In some examples, aspects of the operations of 1520 may be performed by a feedback message manager 835 as described with reference to FIG. 8.

Figure 16:
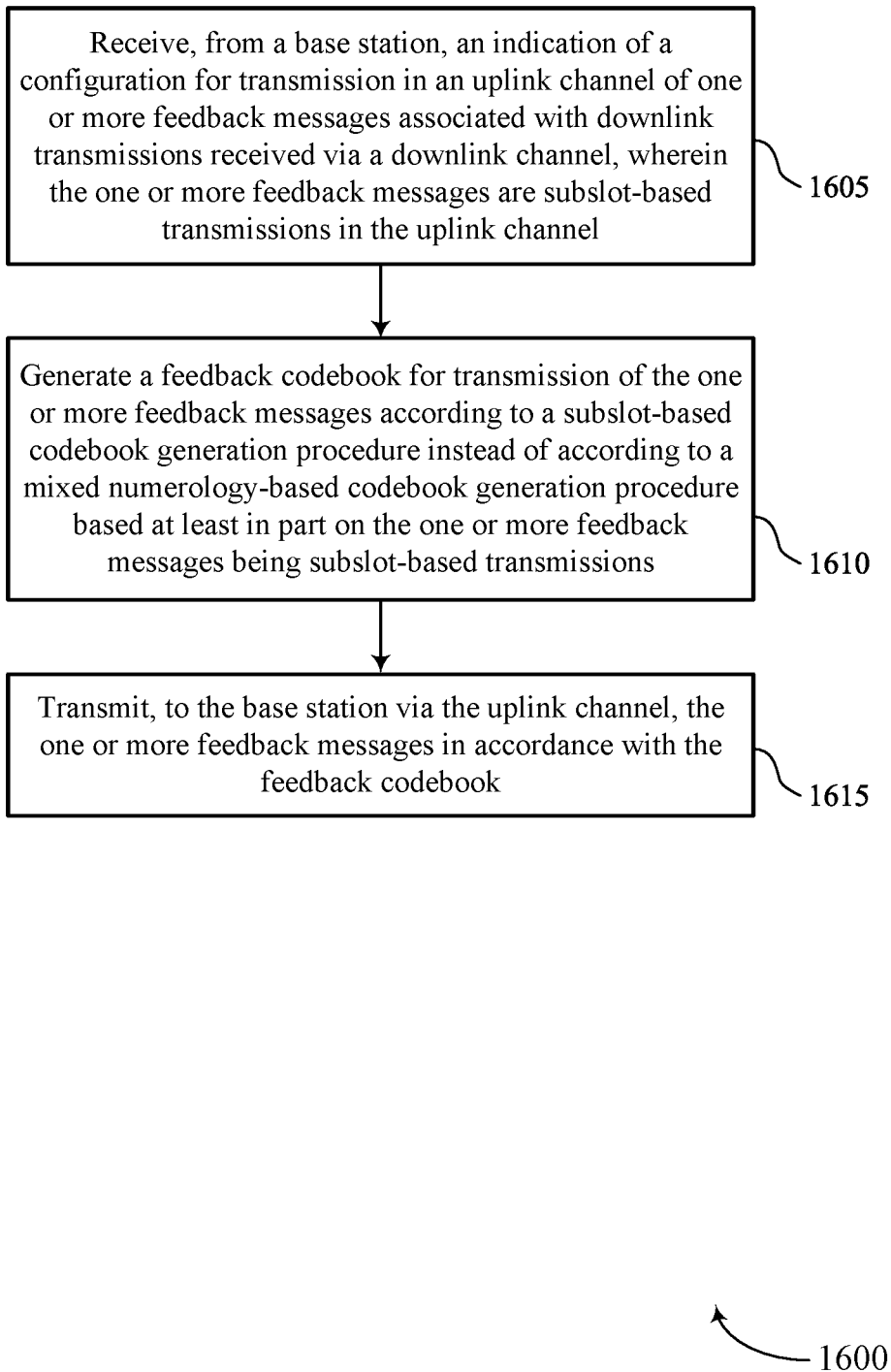

FIG. 16 shows a flowchart illustrating a method 1600 that supports generating a feedback codebook in accordance with aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, an indication of a configuration for transmission in an uplink channel of one or more feedback messages associated with downlink transmissions received via a downlink channel, where the one or more feedback messages are subslot-based transmissions in the uplink channel. The operations of 1605 may be performed in accordance with examples as disclosed herein. In some examples, aspects of the operations of 1605 may be performed by a configuration manager 825 as described with reference to FIG. 8.

At 1610, the method may include generating a feedback codebook for transmission of the one or more feedback messages according to a subslot-based codebook generation procedure instead of according to a mixed numerology-based codebook generation procedure based on the one or more feedback messages being subslot-based transmissions. The operations of 1610 may be performed in accordance with examples as disclosed herein. In some examples, aspects of the operations of 1610 may be performed by a feedback codebook manager 830 as described with reference to FIG. 8.

At 1615, the method may include transmitting, to the base station via the uplink channel, the one or more feedback messages in accordance with the feedback codebook. The operations of 1615 may be performed in accordance with examples as disclosed herein. In some examples, aspects of the operations of 1615 may be performed by a feedback message manager 835 as described with reference to FIG. 8.

Figure 17:
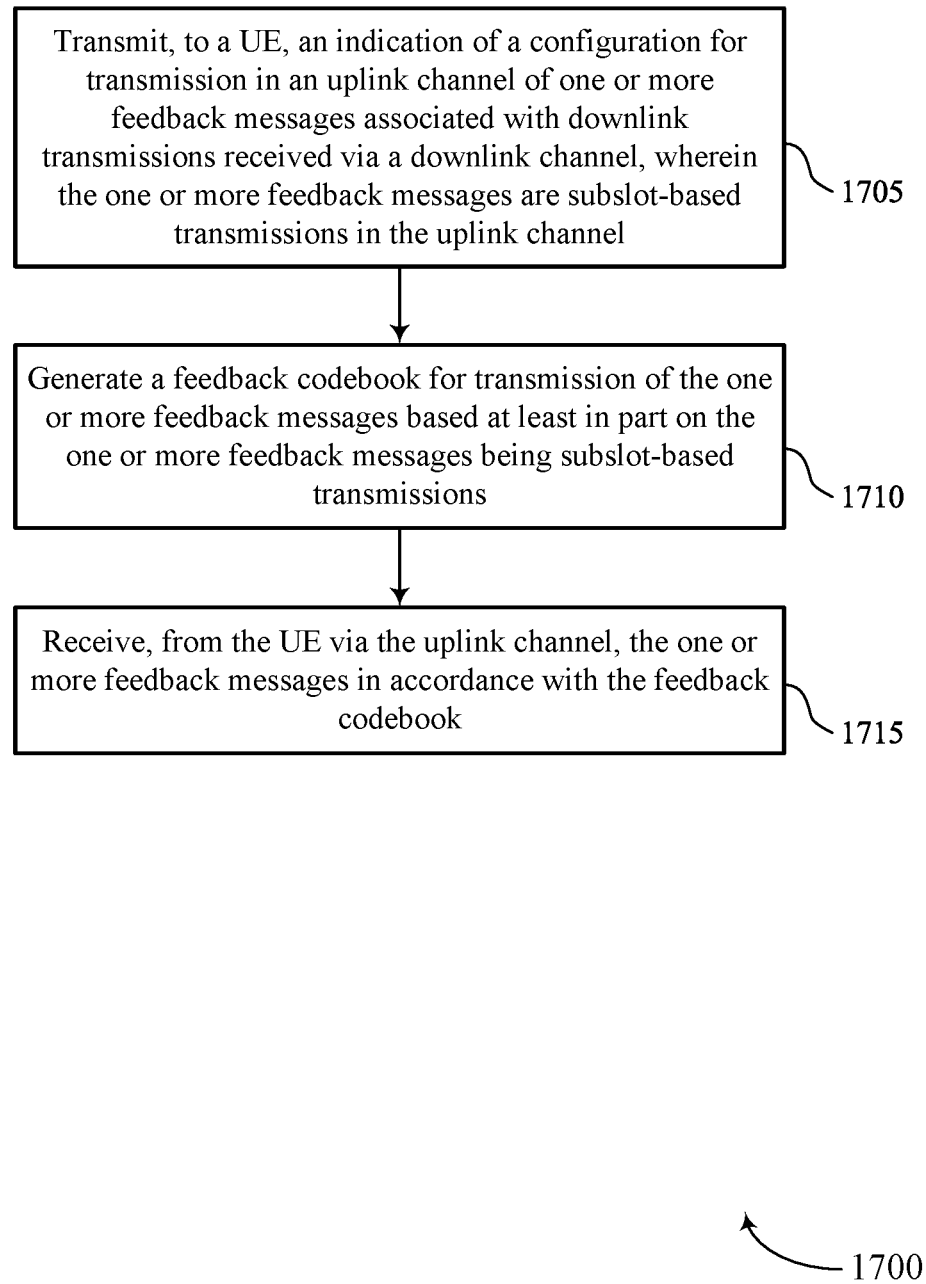

FIG. 17 shows a flowchart illustrating a method 1700 that supports generating a feedback codebook in accordance with aspects of the present disclosure. The operations of the method 1700 may be implemented by a base station or its components as described herein. For example, the operations of the method 1700 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1705, the method may include transmitting, to a UE, an indication of a configuration for transmission in an uplink channel of one or more feedback messages associated with downlink transmissions received via a downlink channel, where the one or more feedback messages are subslot-based transmissions in the uplink channel. The operations of 1705 may be performed in accordance with examples as disclosed herein. In some examples, aspects of the operations of 1705 may be performed by a configuration transmitter 1225 as described with reference to FIG. 12.

At 1710, the method may include generating a feedback codebook for transmission of the one or more feedback messages based on the one or more feedback messages being subslot-based transmissions. The operations of 1710 may be performed in accordance with examples as disclosed herein. In some examples, aspects of the operations of 1710 may be performed by a feedback codebook generator 1230 as described with reference to FIG. 12.

At 1715, the method may include receiving, from the UE via the uplink channel, the one or more feedback messages in accordance with the feedback codebook. The operations of 1715 may be performed in accordance with examples as disclosed herein. In some examples, aspects of the operations of 1715 may be performed by a feedback message component 1235 as described with reference to FIG. 12.

Figure 18:
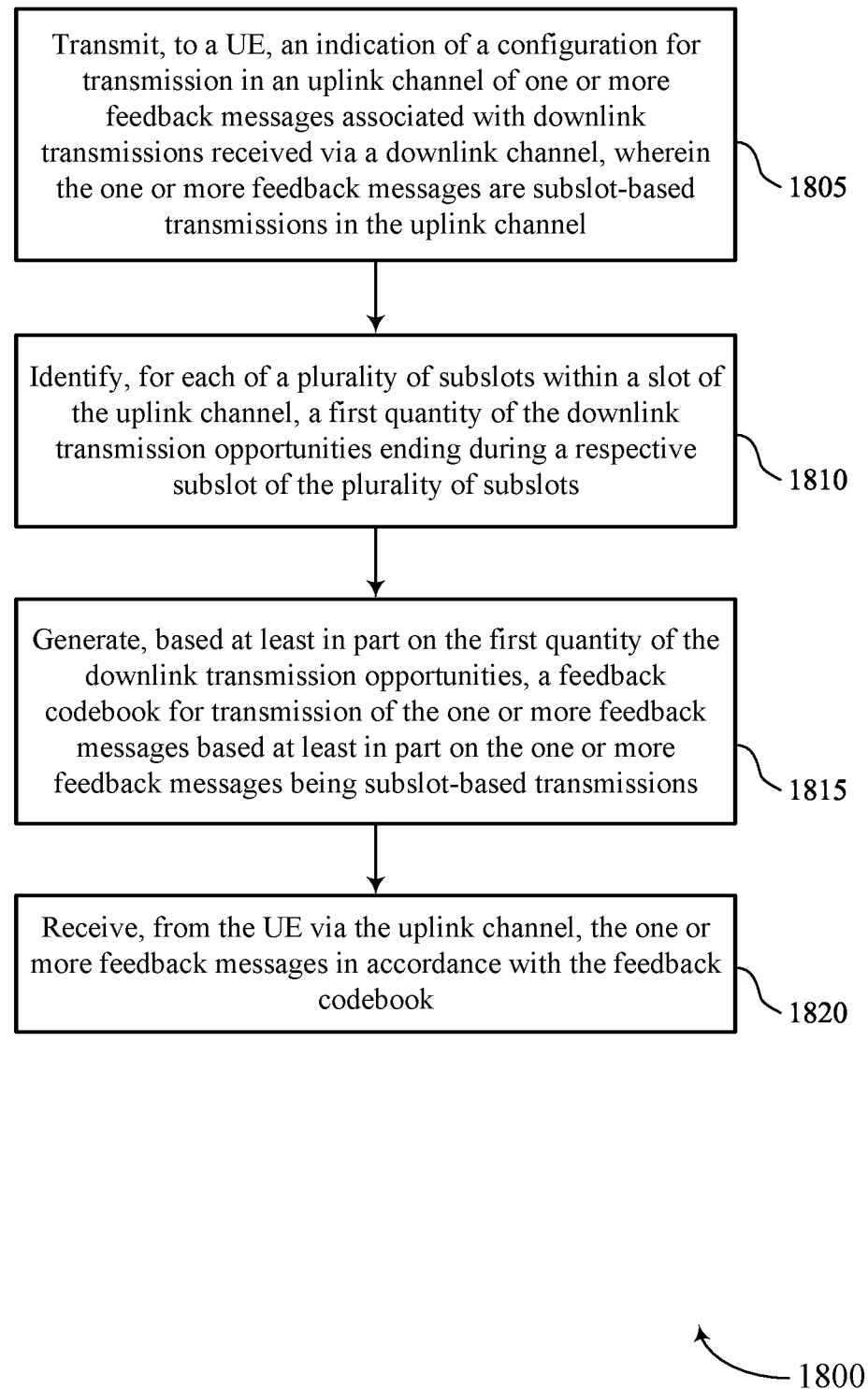

FIG. 18 shows a flowchart illustrating a method 1800 that supports generating a feedback codebook in accordance with aspects of the present disclosure. The operations of the method 1800 may be implemented by a base station or its components as described herein. For example, the operations of the method 1800 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1805, the method may include transmitting, to a UE, an indication of a configuration for transmission in an uplink channel of one or more feedback messages associated with downlink transmissions received via a downlink channel, where the one or more feedback messages are subslot-based transmissions in the uplink channel. The operations of 1805 may be performed in accordance with examples as disclosed herein. In some examples, aspects of the operations of 1805 may be performed by a configuration transmitter 1225 as described with reference to FIG. 12.

At 1810, the method may include identifying, for each of a set of multiple subslots of the uplink channel, a first quantity of the downlink transmission opportunities ending during a respective subslot of the set of multiple subslots. The operations of 1810 may be performed in accordance with examples as disclosed herein. In some examples, aspects of the operations of 1810 may be performed by a downlink transmission opportunity identifier 1240 as described with reference to FIG. 12.

At 1815, the method may include generating, based on the first quantity of the downlink transmission opportunities, a feedback codebook for transmission of the one or more feedback messages based on the one or more feedback messages being subslot-based transmissions. The operations of 1815 may be performed in accordance with examples as disclosed herein. In some examples, aspects of the operations of 1815 may be performed by a feedback codebook generator 1230 as described with reference to FIG. 12.

At 1820, the method may include receiving, from the UE via the uplink channel, the one or more feedback messages in accordance with the feedback codebook. The operations of 1820 may be performed in accordance with examples as disclosed herein. In some examples, aspects of the operations of 1820 may be performed by a feedback message component 1235 as described with reference to FIG. 12.

Figure 19:
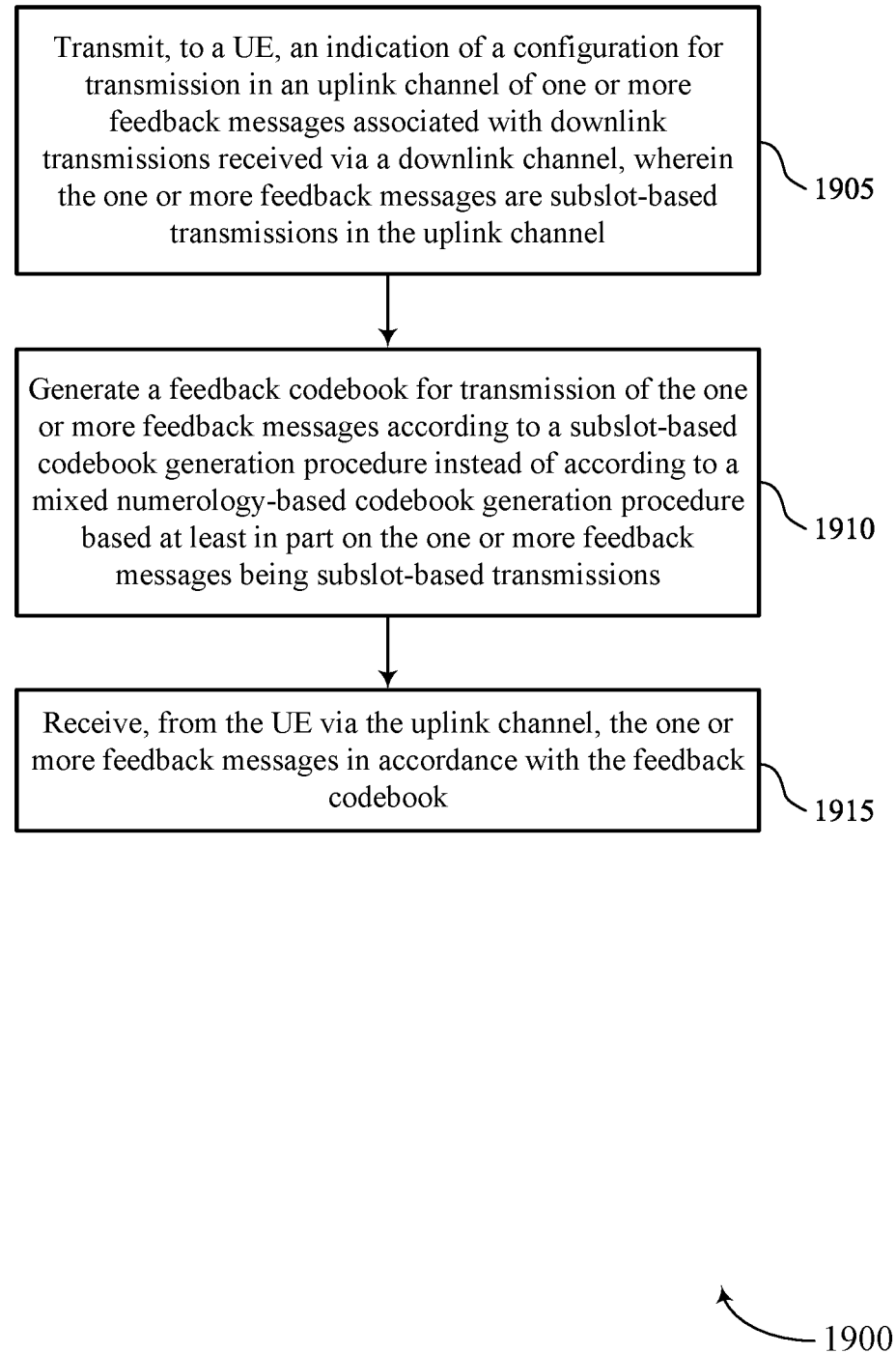

FIG. 19 shows a flowchart illustrating a method 1900 that supports generating a feedback codebook in accordance with aspects of the present disclosure. The operations of the method 1900 may be implemented by a base station or its components as described herein. For example, the operations of the method 1900 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1905, the method may include transmitting, to a UE, an indication of a configuration for transmission in an uplink channel of one or more feedback messages associated with downlink transmissions received via a downlink channel, where the one or more feedback messages are subslot-based transmissions in the uplink channel. The operations of 1905 may be performed in accordance with examples as disclosed herein. In some examples, aspects of the operations of 1905 may be performed by a configuration transmitter 1225 as described with reference to FIG. 12.

At 1910, the method may include generating a feedback codebook for transmission of the one or more feedback messages according to a subslot-based codebook generation procedure instead of according to a mixed numerology-based codebook generation procedure based on the one or more feedback messages being subslot-based transmissions. The operations of 1910 may be performed in accordance with examples as disclosed herein. In some examples, aspects of the operations of 1910 may be performed by a feedback codebook generator 1230 as described with reference to FIG. 12.

At 1915, the method may include receiving, from the UE via the uplink channel, the one or more feedback messages in accordance with the feedback codebook. The operations of 1915 may be performed in accordance with examples as disclosed herein. In some examples, aspects of the operations of 1915 may be performed by a feedback message component 1235 as described with reference to FIG. 12.

The following provides an overview of aspects of the present disclosure:

Aspect 1: A method for wireless communications at a UE, comprising: receiving, from a base station, an indication of a configuration for transmission in an uplink channel of one or more feedback messages associated with downlink transmissions received via a downlink channel, wherein the one or more feedback messages are subslot-based transmissions in the uplink channel; generating a feedback codebook for transmission of the one or more feedback messages based at least in part on the one or more feedback messages being subslot-based transmissions; and transmitting, to the base station via the uplink channel, the one or more feedback messages in accordance with the feedback codebook.

Aspect 2: The method of aspect 1, further comprising: identifying, for each of a plurality of subslots of the uplink channel, a first quantity of downlink transmission opportunities ending during a respective subslot of the plurality of subslots, wherein generating the feedback codebook is based at least in part on the first quantity of the downlink transmission opportunities.

Aspect 3: The method of aspect 2, wherein each of the one or more feedback messages corresponds to one of the plurality of subslots and is associated with respective ones of the first quantity of downlink transmission opportunities ending during the respective subslot of the plurality of subslots.

Aspect 4: The method of any of aspects 1 through 3, wherein generating the feedback codebook comprises: generating the feedback codebook based at least in part on a first numerology associated with the downlink channel and a second numerology associated with the uplink channel being different.

Aspect 5: The method of any of aspects 1 through 4, wherein generating the feedback codebook comprises: generating the feedback codebook independent of whether a first numerology associated with the downlink channel and a second numerology associated with the uplink channel are different.

Aspect 6: The method of any of aspects 1 through 5, wherein generating the feedback codebook comprises: generating the feedback codebook according to a subslot-based codebook generation procedure instead of according to a mixed numerology-based codebook generation procedure.

Aspect 7: The method of any of aspects 1 through 6, further comprising: identifying, for each of a plurality of subslots of the uplink channel, one or more downlink transmission opportunities that overlap a respective subslot of the plurality of subslots; and identifying, for each of the plurality of subslots, a subset of the one or more downlink transmission opportunities ending during the respective subslot of the plurality of subslots, wherein generating the feedback codebook is based at least in part on a first quantity of downlink transmission opportunities within the subset of the one or more downlink transmission opportunities.

Aspect 8: The method of any of aspects 1 through 7, further comprising: receiving, via the downlink channel, a first downlink transmission within a first slot of the downlink channel and a second downlink transmission within a second slot of the downlink channel, wherein both the first downlink transmission and the second downlink transmission end within a same subslot of the uplink channel; and generating a feedback message for transmission via the uplink channel comprising feedback associated with the first and second downlink transmissions based at least in part on both the first and second downlink transmissions ending within the same subslot.

Aspect 9: The method of any of aspects 1 through 8, further comprising: determining that a first slot of the downlink channel and a second slot of the downlink channel overlap with a subslot of the uplink channel; and identifying, based at least in part on the determining, a first quantity of downlink transmission opportunities within the first slot of the downlink channel and a second quantity of downlink transmission opportunities within the second slot of the downlink channel ending during the subslot of the uplink channel, wherein generating the feedback codebook is based at least in part on the first quantity of downlink transmission opportunities and the second quantity of downlink transmission opportunities.

Aspect 10: The method of any of aspects 1 through 9, further comprising: Some identifying a first quantity of slots of the downlink channel that overlap with a subslot of the uplink channel, wherein generating the feedback codebook is based at least in part on identifying the first quantity of slots.

Aspect 11: The method of any of aspects 1 through 10, wherein the configuration of the one or more feedback messages comprises a subslot offset between receipt of the downlink transmissions and transmission of the one or more feedback messages, transmitting the one or more feedback messages is based at least in part on the subslot offset.

Aspect 12: The method of aspect 11, wherein generating the feedback codebook comprises: generating the feedback codebook for transmission of the one or more feedback messages for each of a plurality of possible subslot offsets comprising at least the subslot offset.

Aspect 13: The method of any of aspects 1 through 12, wherein receiving the configuration comprises: receiving RRC signaling indicating the configuration for transmission of the one or more feedback messages.

Aspect 14: The method of any of aspects 1 through 13, wherein slots of the downlink channel are first TTIs each having a first number of symbols, and subslots of the uplink channel are second TTIs each with fewer than the first number of symbols.

Aspect 15: A method for wireless communications at a base station, comprising: transmitting, to a UE, an indication of a configuration for transmission in an uplink channel of one or more feedback messages associated with downlink transmissions received via a downlink channel having a first numerology, wherein the one or more feedback messages are subslot-based transmissions in the uplink channel having a second numerology different from the first numerology; generating a feedback codebook for transmission of the one or more feedback messages based at least in part on the one or more feedback messages being subslot-based transmissions and based at least in part on the first numerology and the second numerology being different; and receiving, from the UE via the uplink channel, the one or more feedback messages in accordance with the feedback codebook.

Aspect 16: The method of aspect 15, further comprising: identifying, for each of a plurality of subslots of the uplink channel, a first quantity of the downlink transmission opportunities ending during a respective subslot of the plurality of subslots, wherein generating the feedback codebook is based at least in part on the first quantity of the downlink transmission opportunities.

Aspect 17: The method of aspect 16, wherein each of the one or more feedback messages corresponds to one of the plurality of subslots and is associated with respective ones of the first quantity of downlink transmission opportunities ending during the respective subslot of the plurality of subslots.

Aspect 18: The method of any of aspects 15 through 17, wherein generating the feedback codebook comprises: generating the feedback codebook based at least in part on a first numerology associated with the downlink channel and a second numerology associated with the uplink channel being different.

Aspect 19: The method of aspect 18, wherein generating the feedback codebook comprises: generating the feedback codebook independent of whether a first numerology associated with the downlink channel and a second numerology associated with the uplink channel are different.

Aspect 20: The method of aspect 18, wherein generating the feedback codebook comprises: generating the feedback codebook according to a subslot-based codebook generation procedure instead of according to a mixed numerology-based codebook generation procedure.

Aspect 21: The method of any of aspects 15 through 20, further comprising: identifying, for each of a plurality of subslots of the uplink channel, one or more downlink transmission opportunities that overlap a respective subslot of the plurality of subslots; and identifying, for each of the plurality of subslots, a subset of the one or more downlink transmission opportunities ending during the respective subslot of the plurality of subslots, wherein generating the feedback codebook is based at least in part on a first quantity of downlink transmission opportunities within the subset of the one or more downlink transmission opportunities.

Aspect 22: The method of any of aspects 15 through 21, further comprising: transmitting, via the downlink channel, a first downlink transmission within a first slot of the downlink channel and a second downlink transmission within a second slot of the downlink channel, wherein both the first downlink transmission and the second downlink transmission end within a same subslot of the uplink channel, wherein one of the one or more feedback messages comprises feedback associated with the first and second downlink transmissions based at least in part on both the first and second downlink transmissions ending within the same subslot.

Aspect 23: The method of any of aspects 15 through 22, further comprising: determining that a first slot of the downlink channel and a second slot of the downlink channel overlap with a subslot of the uplink channel; and identifying, based at least in part on the determining, a first quantity of downlink transmission opportunities within the first slot of the downlink channel and a second quantity of downlink transmission opportunities within the second slot of the downlink channel ending during the subslot of the uplink channel, wherein generating the feedback codebook is based at least in part on the first quantity of downlink transmission opportunities and the second quantity of downlink transmission opportunities.

Aspect 24: The method of any of aspects 15 through 23, further comprising: identifying a first quantity of slots of the downlink channel that overlap with a subslot of the uplink channel, wherein generating the feedback codebook is based at least in part on identifying the first quantity of slots.

Aspect 25: The method of any of aspects 15 through 24, wherein the configuration of the one or more feedback messages comprises a subslot offset between receipt of the downlink transmissions and transmission of the one or more feedback messages, receiving the one or more feedback messages is based at least in part on the subslot offset.

Aspect 26: The method of aspect 25, wherein generating the feedback codebook comprises: generating the feedback codebook for transmission of the one or more feedback messages for each of a plurality of possible subslot offsets comprising at least the subslot offset.

Aspect 27: The method of any of aspects 15 through 26, wherein transmitting the configuration comprises: receiving RRC signaling indicating the configuration for transmission of the one or more feedback messages.

Aspect 28: The method of any of aspects 15 through 27, wherein slots of the downlink channel are first TTIs each having a first number of symbols, and subslots of the uplink channel are second TTIs each with fewer than the first number of symbols.

Aspect 29: An apparatus for wireless communications at a UE, comprising a processor; memory coupled with the processor; and instructions stored in the memory and executable by the processor to cause the apparatus to perform a method of any of aspects 1 through 14.

Aspect 30: An apparatus for wireless communications at a UE, comprising at least one means for performing a method of any of aspects 1 through 14.

Aspect 31: A non-transitory computer-readable medium storing code for wireless communications at a UE, the code comprising instructions executable by a processor to perform a method of any of aspects 1 through 14.

Aspect 32: An apparatus for wireless communications at a base station, comprising a processor; memory coupled with the processor; and instructions stored in the memory and executable by the processor to cause the apparatus to perform a method of any of aspects 15 through 28.

Aspect 33: An apparatus for wireless communications at a base station, comprising at least one means for performing a method of any of aspects 15 through 28.

Aspect 34: A non-transitory computer-readable medium storing code for wireless communications at a base station, the code comprising instructions executable by a processor to perform a method of any of aspects 15 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
receiving, from a base station, an indication of a configuration for transmission in an uplink channel of one or more feedback messages associated with downlink transmissions received via a downlink channel, wherein the one or more feedback messages are subslot-based transmissions in the uplink channel, wherein an uplink numerology associated with the uplink channel is different from a downlink numerology associated with the downlink channel, and wherein the indication comprises a radio resource control parameter subslotLengthForPUCCH;
generating a feedback codebook for transmission of the one or more feedback messages according to a subslot-based codebook generation procedure instead of according to a mixed numerology-based codebook generation procedure based at least in part on the one or more feedback messages being subslot-based transmissions and based at least in part on the radio resource control parameter subslotLengthForPUCCH; and
transmitting, to the base station via the uplink channel, the one or more feedback messages in accordance with the feedback codebook.

2. The method of claim 1, further comprising:
identifying, for each of a plurality of subslots of the uplink channel, a first quantity of downlink transmission opportunities ending during a respective subslot of the plurality of subslots, wherein generating the feedback codebook is based at least in part on the first quantity of the downlink transmission opportunities.

3. The method of claim 2, wherein each of the one or more feedback messages corresponds to one of the plurality of subslots and is associated with respective ones of the first quantity of downlink transmission opportunities ending during the respective subslot of the plurality of subslots.

4. The method of claim 1, wherein generating the feedback codebook comprises:
generating the feedback codebook based at least in part on a first numerology associated with the downlink channel and a second numerology associated with the uplink channel being different.

5. The method of claim 1, wherein generating the feedback codebook comprises:
generating the feedback codebook independent of whether a first numerology associated with the downlink channel and a second numerology associated with the uplink channel are different.

6. The method of claim 1, further comprising:
identifying, for each of a plurality of subslots of the uplink channel, one or more downlink transmission opportunities that overlap a respective subslot of the plurality of subslots; and
identifying, for each of the plurality of subslots, a subset of the one or more downlink transmission opportunities ending during the respective subslot of the plurality of subslots, wherein generating the feedback codebook is based at least in part on a first quantity of downlink transmission opportunities within the subset of the one or more downlink transmission opportunities.

7. The method of claim 1, further comprising:
receiving, via the downlink channel, a first downlink transmission within a first slot of the downlink channel and a second downlink transmission within a second slot of the downlink channel, wherein both the first downlink transmission and the second downlink transmission end within a same subslot of the uplink channel; and
generating a feedback message for transmission via the uplink channel comprising feedback associated with the first and second downlink transmissions based at least in part on both the first and second downlink transmissions ending within the same subslot.

8. The method of claim 1, further comprising:
determining that a first slot of the downlink channel and a second slot of the downlink channel overlap with a subslot of the uplink channel; and
identifying, based at least in part on the determining, a first quantity of downlink transmission opportunities within the first slot of the downlink channel and a second quantity of downlink transmission opportunities within the second slot of the downlink channel ending during the subslot of the uplink channel, wherein generating the feedback codebook is based at least in part on the first quantity of downlink transmission opportunities and the second quantity of downlink transmission opportunities.

9. The method of claim 1, further comprising:
identifying a first quantity of slots of the downlink channel that overlap with a subslot of the uplink channel, wherein generating the feedback codebook is based at least in part on identifying the first quantity of slots.

10. The method of claim 1, wherein:
the configuration of the one or more feedback messages comprises a subslot offset between receipt of the downlink transmissions and transmission of the one or more feedback messages, and wherein:
transmitting the one or more feedback messages is based at least in part on the subslot offset.

11. The method of claim 10, wherein generating the feedback codebook comprises:
generating the feedback codebook for transmission of the one or more feedback messages for each of a plurality of possible subslot offsets comprising at least the subslot offset.

12. The method of claim 1, wherein receiving the configuration comprises:
receiving radio resource control signaling indicating the configuration for transmission of the one or more feedback messages.

13. The method of claim 1, wherein:
slots of the downlink channel are first transmission time intervals each having a first number of symbols, and
subslots of the uplink channel are second transmission time intervals each with fewer than the first number of symbols.

14. A method for wireless communications at a base station, comprising:
transmitting, to a user equipment (UE), an indication of a configuration for transmission in an uplink channel of one or more feedback messages associated with downlink transmissions received via a downlink channel, wherein the one or more feedback messages are subslot-based transmissions in the uplink channel, wherein an uplink numerology associated with the uplink channel is different from a downlink numerology associated with the downlink channel, and wherein the indication comprises a radio resource control parameter subslot-LengthForPUCCH;
generating a feedback codebook for transmission of the one or more feedback messages according to a subslot-based codebook generation procedure instead of according to a mixed numerology-based codebook generation procedure based at least in part on the one or more feedback messages being subslot-based transmissions and based at least in part on the radio resource control parameter subslotLengthForPUCCH; and
receiving, from the UE via the uplink channel, the one or more feedback messages in accordance with the feedback codebook.

15. The method of claim 14, further comprising:
identifying, for each of a plurality of subslots of the uplink channel, a first quantity of downlink transmission opportunities ending during a respective subslot of the plurality of subslots, wherein generating the feedback codebook is based at least in part on the first quantity of the downlink transmission opportunities.

16. The method of claim 15, wherein each of the one or more feedback messages corresponds to one of the plurality of subslots and is associated with respective ones of the first quantity of downlink transmission opportunities ending during the respective subslot of the plurality of subslots.

17. The method of claim 14, wherein generating the feedback codebook comprises:
generating the feedback codebook based at least in part on a first numerology associated with the downlink channel and a second numerology associated with the uplink channel being different.

18. The method of claim 14, wherein generating the feedback codebook comprises:
generating the feedback codebook independent of whether a first numerology associated with the downlink channel and a second numerology associated with the uplink channel are different.

19. The method of claim 14, further comprising:
identifying, for each of a plurality of subslots of the uplink channel, one or more downlink transmission opportunities that overlap a respective subslot of the plurality of subslots; and
identifying, for each of the plurality of subslots, a subset of the one or more downlink transmission opportunities ending during the respective subslot of the plurality of subslots, wherein generating the feedback codebook is based at least in part on a first quantity of downlink transmission opportunities within the subset of the one or more downlink transmission opportunities.

20. The method of claim 14, further comprising:
transmitting, via the downlink channel, a first downlink transmission within a first slot of the downlink channel and a second downlink transmission within a second slot of the downlink channel, wherein both the first downlink transmission and the second downlink transmission end within a same subslot of the uplink channel, wherein one of the one or more feedback messages comprises feedback associated with the first and second downlink transmissions based at least in part on both the first and second downlink transmissions ending within the same subslot.

21. The method of claim 14, further comprising:
determining that a first slot of the downlink channel and a second slot of the downlink channel overlap with a subslot of the uplink channel; and
identifying, based at least in part on the determining, a first quantity of downlink transmission opportunities within the first slot of the downlink channel and a second quantity of downlink transmission opportunities within the second slot of the downlink channel ending during the subslot of the uplink channel, wherein generating the feedback codebook is based at least in part on the first quantity of downlink transmission opportunities and the second quantity of downlink transmission opportunities.

22. The method of claim 14, further comprising:
identifying a first quantity of slots of the downlink channel that overlap with a subslot of the uplink channel, wherein generating the feedback codebook is based at least in part on identifying the first quantity of slots.

23. The method of claim 14, wherein:
the configuration of the one or more feedback messages comprises a subslot offset between receipt of the downlink transmissions and transmission of the one or more feedback messages, and wherein:
receiving the one or more feedback messages is based at least in part on the subslot offset.

24. The method of claim 23, wherein generating the feedback codebook comprises:

generating the feedback codebook for transmission of the one or more feedback messages for each of a plurality of possible subslot offsets comprising at least the subslot offset.

25. The method of claim 15, wherein transmitting the configuration comprises:
receiving radio resource control signaling indicating the configuration for transmission of the one or more feedback messages.

26. The method of claim 14, wherein:
slots of the downlink channel are first transmission time intervals each having a first number of symbols, and
subslots of the uplink channel are second transmission time intervals each with fewer than the first number of symbols.

27. An apparatus for wireless communications, comprising:
a processor;
memory coupled with the processor; and
instructions stored in the memory and executable by the processor to cause the apparatus to:
receive, from a base station, an indication of a configuration for transmission in an uplink channel of one or more feedback messages associated with downlink transmissions received via a downlink channel, wherein the one or more feedback messages are subslot-based transmissions in the uplink channel, wherein an uplink numerology associated with the uplink channel is different from a downlink numerology associated with the downlink channel, and wherein the indication comprises a radio resource control parameter subslotLengthForPUCCH;
generate a feedback codebook for transmission of the one or more feedback messages according to a subslot-based codebook generation procedure instead of according to a mixed numerology-based codebook generation procedure based at least in part on the one or more feedback messages being subslot-based transmissions and based at least in part on the radio resource control parameter subslotLengthForPUCCH; and
transmit, to the base station via the uplink channel, the one or more feedback messages in accordance with the feedback codebook.

28. The apparatus of claim 27, wherein the instructions are further executable by the processor to cause the apparatus to:
identify, for each of a plurality of subslots of the uplink channel, a first quantity of downlink transmission opportunities ending during a respective subslot of the plurality of subslots, wherein generating the feedback codebook is based at least in part on the first quantity of the downlink transmission opportunities.

29. The apparatus of claim 28, wherein each of the one or more feedback messages corresponds to one of the plurality of subslots and is associated with respective ones of the first quantity of downlink transmission opportunities ending during the respective subslot of the plurality of subslots.

30. The apparatus of claim 27, wherein the instructions to generate the feedback codebook are executable by the processor to cause the apparatus to:
generate the feedback codebook based at least in part on a first numerology associated with the downlink channel and a second numerology associated with the uplink channel being different.

31. The apparatus of claim 27, wherein the instructions to generate the feedback codebook are executable by the processor to cause the apparatus to:
generate the feedback codebook independent of whether a first numerology associated with the downlink channel and a second numerology associated with the uplink channel are different.

32. The apparatus of claim 27, wherein the instructions are further executable by the processor to cause the apparatus to:
identify, for each of a plurality of subslots of the uplink channel, one or more downlink transmission opportunities that overlap a respective subslot of the plurality of subslots; and
identify, for each of the plurality of subslots, a subset of the one or more downlink transmission opportunities ending during the respective subslot of the plurality of subslots, wherein generating the feedback codebook is based at least in part on a first quantity of downlink transmission opportunities within the subset of the one or more downlink transmission opportunities.

33. The apparatus of claim 27, wherein the instructions are further executable by the processor to cause the apparatus to:
receive, via the downlink channel, a first downlink transmission within a first slot of the downlink channel and a second downlink transmission within a second slot of the downlink channel, wherein both the first downlink transmission and the second downlink transmission end within a same subslot of the uplink channel; and
generate a feedback message for transmission via the uplink channel comprising feedback associated with the first and second downlink transmissions based at least in part on both the first and second downlink transmissions ending within the same subslot.

34. The apparatus of claim 27, wherein the instructions are further executable by the processor to cause the apparatus to:
determine that a first slot of the downlink channel and a second slot of the downlink channel overlap with a subslot of the uplink channel; and
identify, based at least in part on the determining, a first quantity of downlink transmission opportunities within the first slot of the downlink channel and a second quantity of downlink transmission opportunities within the second slot of the downlink channel ending during the subslot of the uplink channel, wherein generating the feedback codebook is based at least in part on the first quantity of downlink transmission opportunities and the second quantity of downlink transmission opportunities.

35. The apparatus of claim 27, wherein the instructions are further executable by the processor to cause the apparatus to:
identify a first quantity of slots of the downlink channel that overlap with a subslot of the uplink channel, wherein generating the feedback codebook is based at least in part on identifying the first quantity of slots.

36. The apparatus of claim 27, wherein:
the configuration of the one or more feedback messages comprises a subslot offset between receipt of the downlink transmissions and transmission of the one or more feedback messages, and wherein:
transmitting the one or more feedback messages is based at least in part on the subslot offset.

37. The apparatus of claim 36, wherein the instructions to generate the feedback codebook are executable by the processor to cause the apparatus to:
generate the feedback codebook for transmission of the one or more feedback messages for each of a plurality of possible subslot offsets comprising at least the subslot offset.

38. The apparatus of claim 27, wherein the instructions to receive the configuration are executable by the processor to cause the apparatus to:
receive radio resource control signaling indicating the configuration for transmission of the one or more feedback messages.

39. The apparatus of claim 27, wherein:
slots of the downlink channel are first transmission time intervals each having a first number of symbols, and
subslots of the uplink channel are second transmission time intervals each with fewer than the first number of symbols.

40. An apparatus for wireless communications, comprising:
a processor;
memory coupled with the processor; and
instructions stored in the memory and executable by the processor to cause the apparatus to:
transmit, to a user equipment (UE), an indication of a configuration for transmission in an uplink channel of one or more feedback messages associated with downlink transmissions received via a downlink channel, wherein the one or more feedback messages are subslot-based transmissions in the uplink channel, wherein an uplink numerology associated with the uplink channel is different from a downlink numerology associated with the downlink channel, and wherein the indication comprises a radio resource control parameter subslotLengthForPUCCH;
generate a feedback codebook for transmission of the one or more feedback messages according to a subslot-based codebook generation procedure instead of according to a mixed numerology-based codebook generation procedure based at least in part on the one or more feedback messages being subslot-based transmissions and based at least in part on the radio resource control parameter subslotLengthForPUCCH; and
receive, from the UE via the uplink channel, the one or more feedback messages in accordance with the feedback codebook.

41. The apparatus of claim 40, wherein the instructions are further executable by the processor to cause the apparatus to:
identify, for each of a plurality of subslots of the uplink channel, a first quantity of downlink transmission opportunities ending during a respective subslot of the plurality of subslots, wherein generating the feedback codebook is based at least in part on the first quantity of the downlink transmission opportunities.

42. The apparatus of claim 41, wherein each of the one or more feedback messages corresponds to one of the plurality of subslots and is associated with respective ones of the first quantity of downlink transmission opportunities ending during the respective subslot of the plurality of subslots.

43. The apparatus of claim 40, wherein the instructions to generate the feedback codebook are executable by the processor to cause the apparatus to:
generate the feedback codebook based at least in part on a first numerology associated with the downlink channel and a second numerology associated with the uplink channel being different.

44. The apparatus of claim 40, wherein the instructions to generate the feedback codebook are executable by the processor to cause the apparatus to:
generate the feedback codebook independent of whether a first numerology associated with the downlink channel and a second numerology associated with the uplink channel are different.

45. The apparatus of claim 40, wherein the instructions are further executable by the processor to cause the apparatus to:
identify, for each of a plurality of subslots of the uplink channel, one or more downlink transmission opportunities that overlap a respective subslot of the plurality of subslots; and
identify, for each of the plurality of subslots, a subset of the one or more downlink transmission opportunities ending during the respective subslot of the plurality of subslots, wherein generating the feedback codebook is based at least in part on a first quantity of downlink transmission opportunities within the subset of the one or more downlink transmission opportunities.

46. The apparatus of claim 40, wherein the instructions are further executable by the processor to cause the apparatus to:
transmit, via the downlink channel, a first downlink transmission within a first slot of the downlink channel and a second downlink transmission within a second slot of the downlink channel, wherein both the first downlink transmission and the second downlink transmission end within a same subslot of the uplink channel, wherein one of the one or more feedback messages comprises feedback associated with the first and second downlink transmissions based at least in part on both the first and second downlink transmissions ending within the same subslot.

47. The apparatus of claim 40, wherein the instructions are further executable by the processor to cause the apparatus to:
determine that a first slot of the downlink channel and a second slot of the downlink channel overlap with a subslot of the uplink channel; and
identify, based at least in part on the determining, a first quantity of downlink transmission opportunities within the first slot of the downlink channel and a second quantity of downlink transmission opportunities within the second slot of the downlink channel ending during the subslot of the uplink channel, wherein generating the feedback codebook is based at least in part on the first quantity of downlink transmission opportunities and the second quantity of downlink transmission opportunities.

48. The apparatus of claim 40, wherein the instructions are further executable by the processor to cause the apparatus to:
identify a first quantity of slots of the downlink channel that overlap with a subslot of the uplink channel, wherein generating the feedback codebook is based at least in part on identifying the first quantity of slots.

49. The apparatus of claim 40, wherein:
the configuration of the one or more feedback messages comprises a subslot offset between receipt of the downlink transmissions and transmission of the one or more feedback messages, and wherein:

receiving the one or more feedback messages is based at least in part on the subslot offset.

50. The apparatus of claim 49, wherein the instructions to generate the feedback codebook are executable by the processor to cause the apparatus to:
generate the feedback codebook for transmission of the one or more feedback messages for each of a plurality of possible subslot offsets comprising at least the subslot offset.

51. The apparatus of claim 40, wherein the instructions to transmit the configuration are executable by the processor to cause the apparatus to:
receive radio resource control signaling indicating the configuration for transmission of the one or more feedback messages.

52. The apparatus of claim 40, wherein:
slots of the downlink channel are first transmission time intervals each having a first number of symbols, and
subslots of the uplink channel are second transmission time intervals each with fewer than the first number of symbols.

\* \* \* \* \*